(12) United States Patent
Noda

(10) Patent No.: US 7,586,691 B2
(45) Date of Patent: Sep. 8, 2009

(54) VARIABLE-POWER IMAGING OPTICAL SYSTEM AND IMAGING DEVICE

(75) Inventor: Takayuki Noda, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/654,592

(22) Filed: Jan. 18, 2007

(65) Prior Publication Data

US 2007/0171544 A1   Jul. 26, 2007

(30) Foreign Application Priority Data

Jan. 19, 2006   (JP)   ............................ P2006-011659

(51) Int. Cl.
*G02B 15/14* (2006.01)
(52) U.S. Cl. ...................... 359/689; 359/680
(58) Field of Classification Search ............... 359/680, 359/686, 689
See application file for complete search history.

(56) References Cited

U.S. PATENT DOCUMENTS

| | | | | |
|---|---|---|---|---|
| 7,339,749 | B2 * | 3/2008 | Katakura | ................. 359/689 |
| 2004/0004772 | A1 * | 1/2004 | Ohashi et al. | ............... 359/689 |
| 2004/0042781 | A1 | 3/2004 | Mihara | |
| 2005/0057816 | A1 | 3/2005 | Sato | |
| 2005/0200969 | A1 * | 9/2005 | Nose et al. | ................... 359/680 |
| 2005/0286138 | A1 | 12/2005 | Matsusaka | |
| 2006/0245078 | A1 * | 11/2006 | Kawamura | ................... 359/689 |
| 2007/0121217 | A1 * | 5/2007 | Hozumi et al. | .............. 359/680 |
| 2007/0121218 | A1 * | 5/2007 | Yamaguchi et al. | ......... 359/680 |

FOREIGN PATENT DOCUMENTS

| | | | |
|---|---|---|---|
| JP | 10-133115 | A | 5/1998 |
| JP | 2000-267009 | A | 9/2000 |
| JP | 2001-296476 | A | 10/2001 |
| JP | 2003-344769 | A | 12/2003 |
| JP | 2004-93647 | A | 3/2004 |
| JP | 2005-84597 | A | 3/2005 |

\* cited by examiner

*Primary Examiner*—Darryl J Collins
(74) *Attorney, Agent, or Firm*—Birch, Stewart, Kolasch & Birch, LLP

(57) ABSTRACT

A variable-power imaging optical system is provided and includes three, negative, positive and positive lenses. A first group includes a negative lens and a positive lens. A second lens group includes a positive lens, a negative lens and an aberration-correcting lens. A third lens group includes an aberration-correcting lens $L_6$. During zooming, the first and second lens groups are independently moved from each other. During focusing, the first and second lens groups are moved jointly. Ng2>1.6, vg2<29 and TL/YIM<11.0 are satisfied. (Ng2: refractive index of the second lens $L_2$, vg2: Abbe number of the second lens $L_2$, TL: maximum lens-system overall length, YIM: image height (a half length of a diagonal line).)

26 Claims, 15 Drawing Sheets

FIG. 6
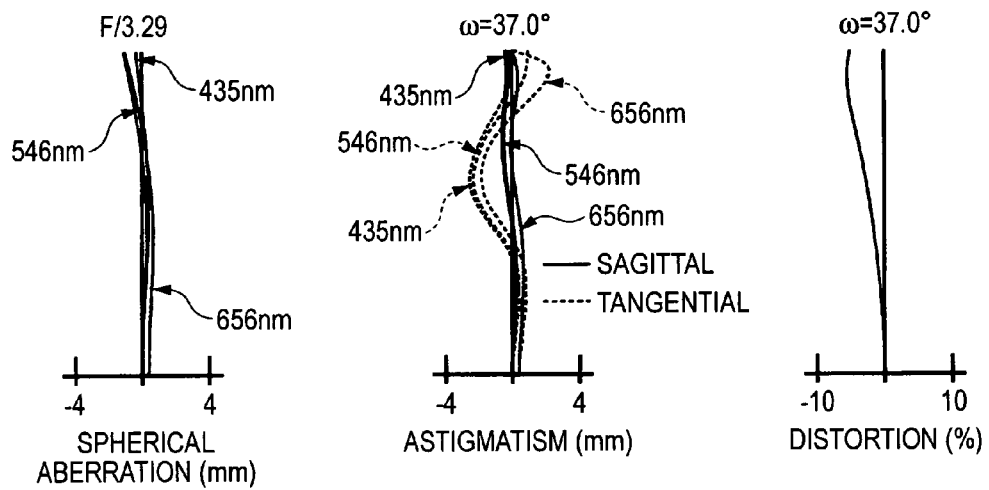
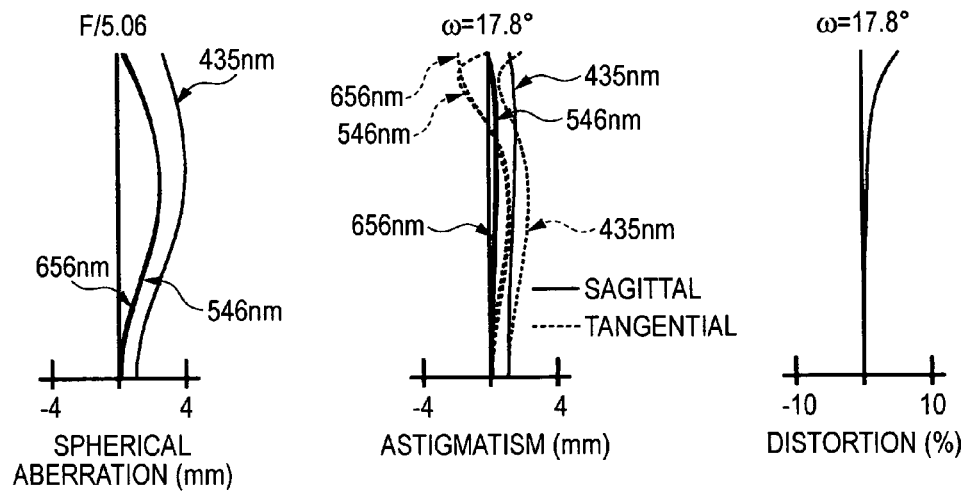

FIG. 7
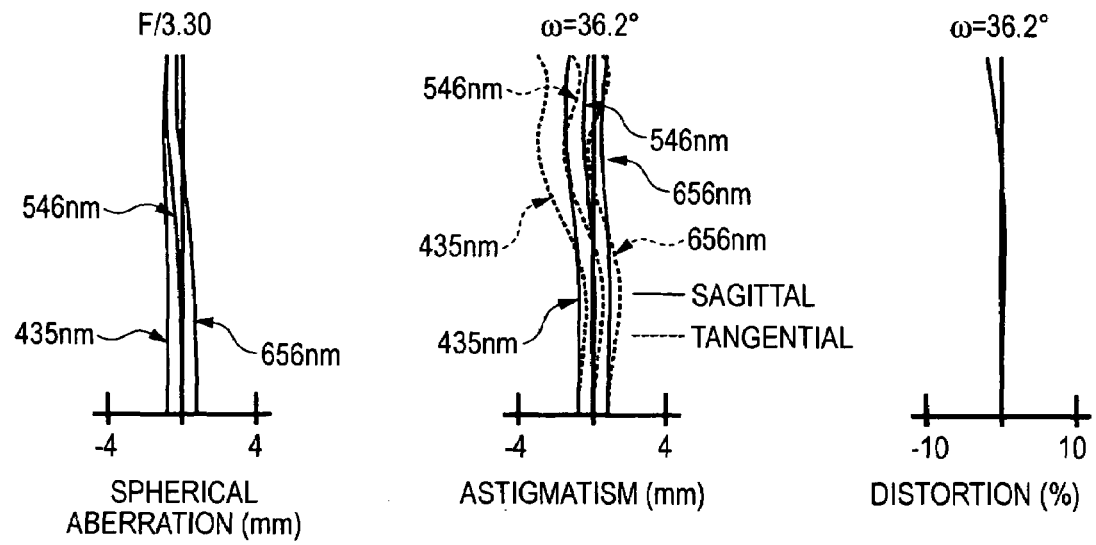
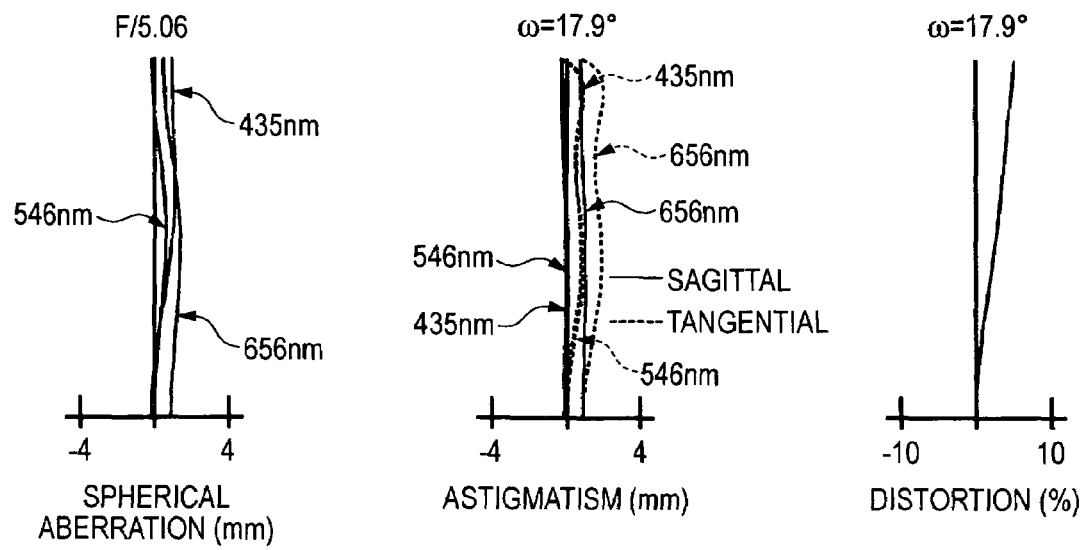

FIG. 8
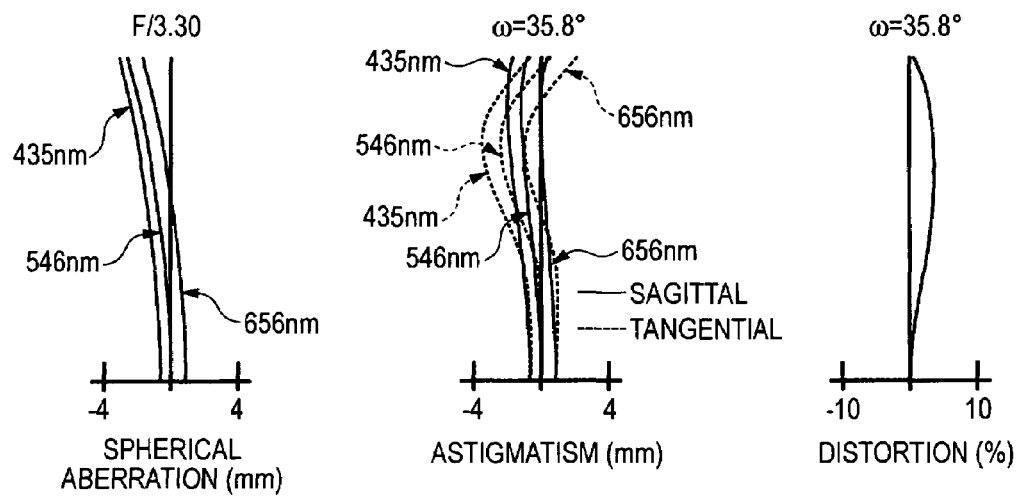
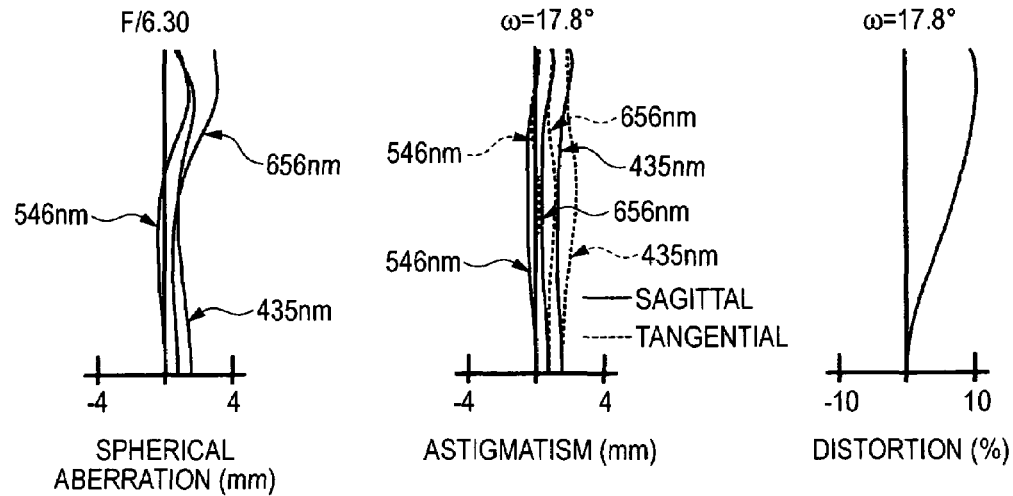

FIG. 9
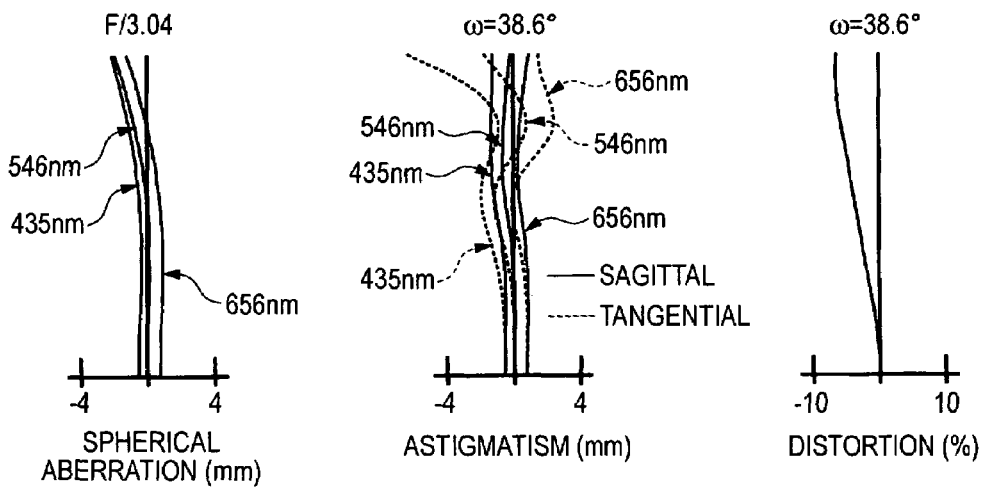
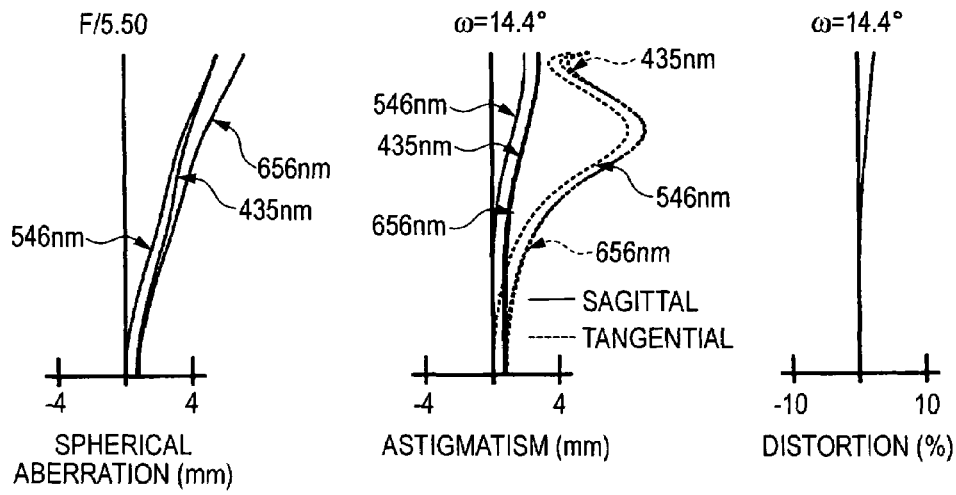

FIG. 10
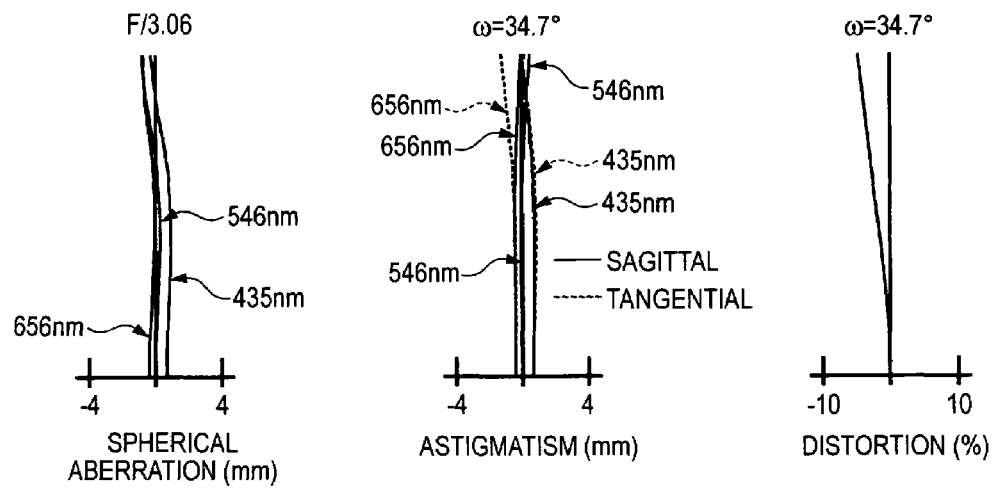
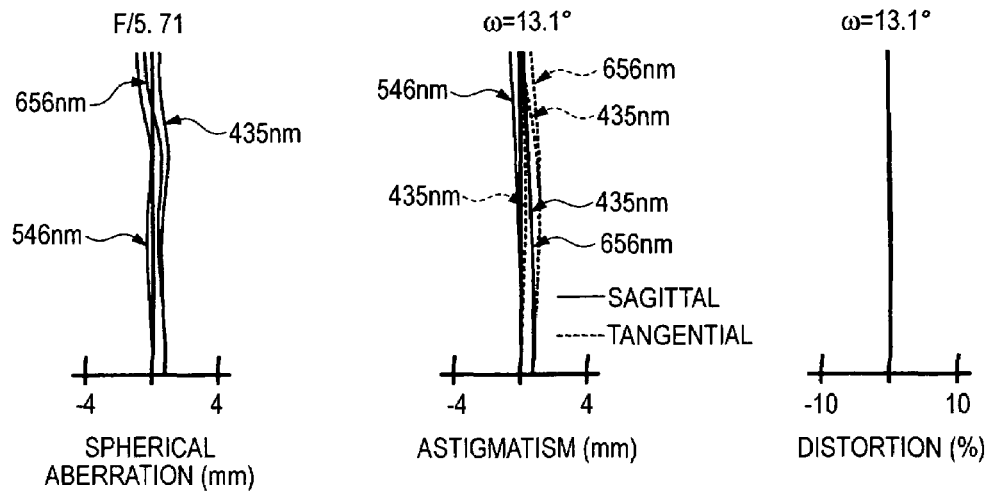

FIG. 11
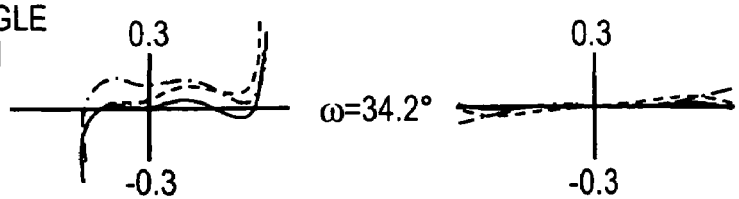
WIDE-ANGLE POSITION ω=34.2°
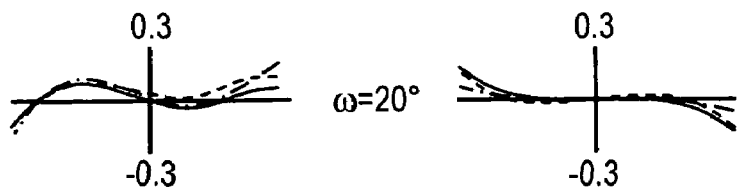
ω=20°
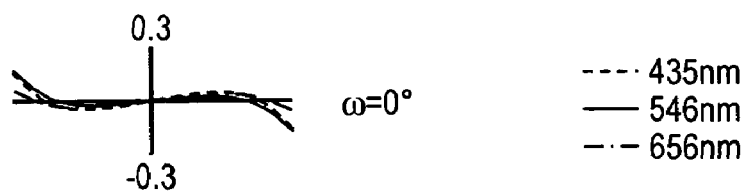
ω=0°
---- 435nm
—— 546nm
—·— 656nm
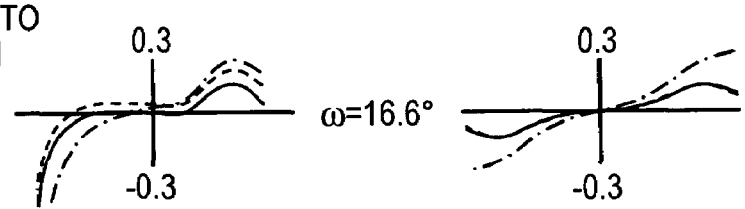
TELEPHOTO POSITION ω=16.6°
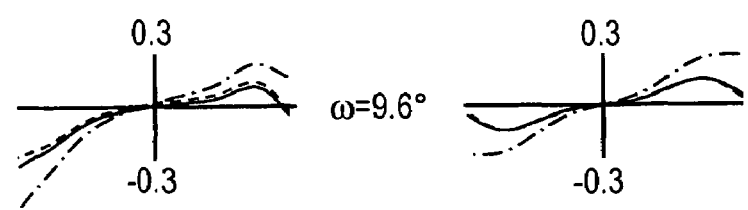
ω=9.6°
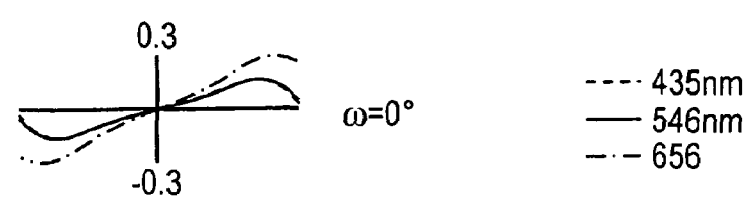
ω=0°
---- 435nm
—— 546nm
—·— 656

FIG. 13
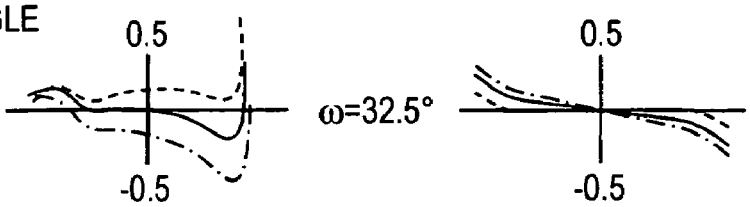
WIDE-ANGLE POSITION, ω=32.5°
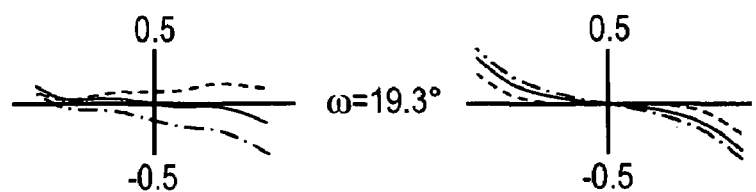
ω=19.3°
---- 435nm
—— 546nm
—·— 656nm
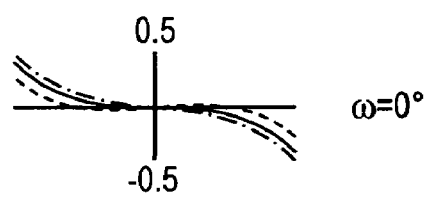
ω=0°
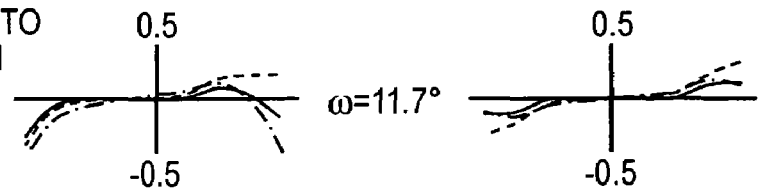
TELEPHOTO POSITION, ω=11.7°
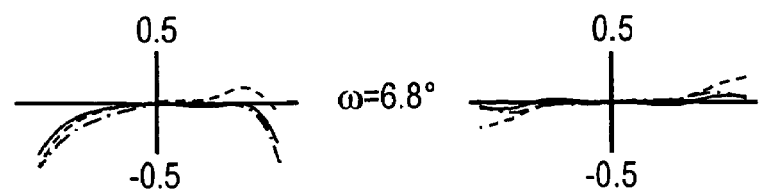
ω=6.8°
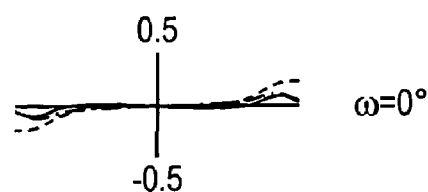
ω=0°
---- 435nm
—— 546nm
—·— 656nm

FIG. 14
WIDE-ANGLE POSITION
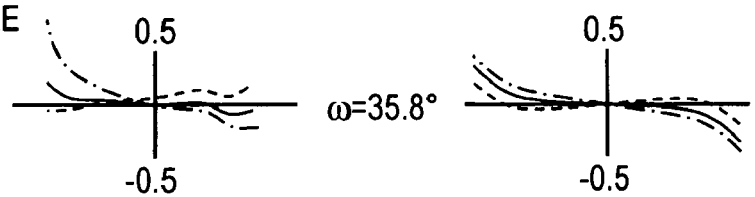
ω=35.8°
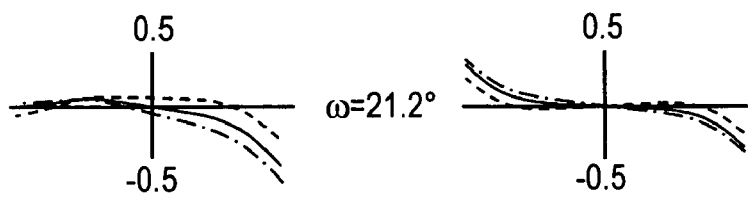
ω=21.2°
ω=0°
---- 435nm
—— 546nm
—·— 656nm
TELEPHOTO POSITION
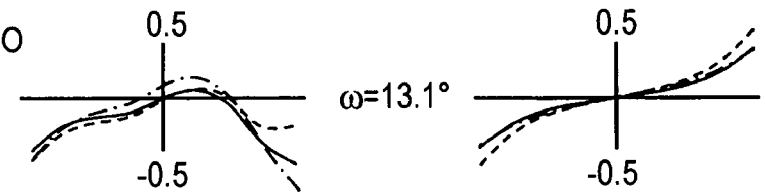
ω=13.1°
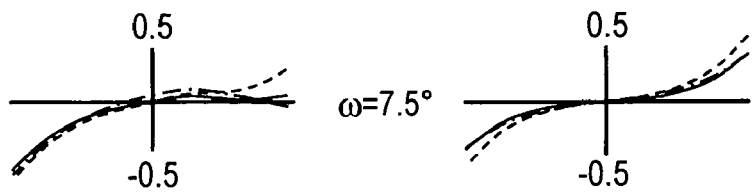
ω=7.5°
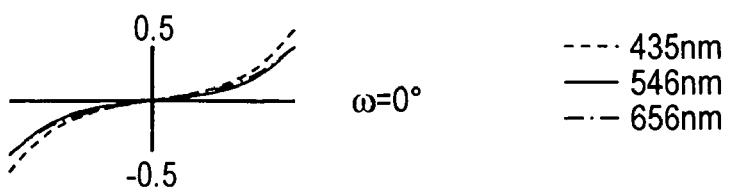
ω=0°
---- 435nm
—— 546nm
—·— 656nm

FIG. 15
WIDE-ANGLE POSITION
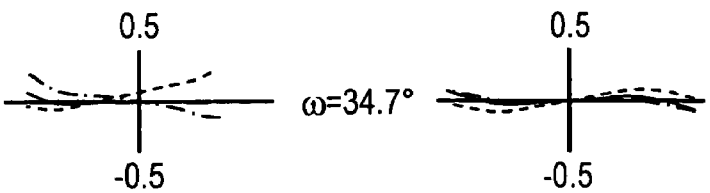
ω=34.7°
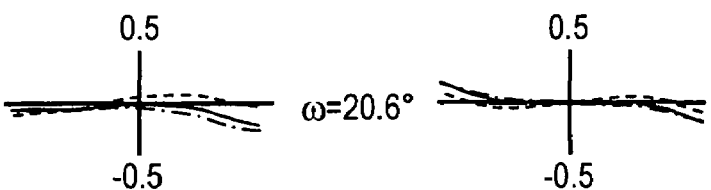
ω=20.6°
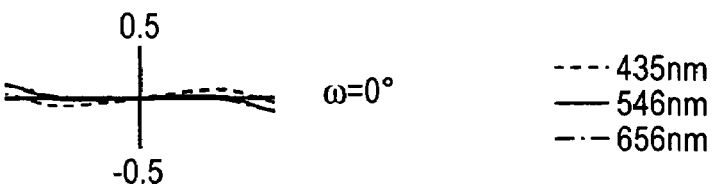
ω=0°
---- 435nm
—— 546nm
—·— 656nm
TELEPHOTO POSITION
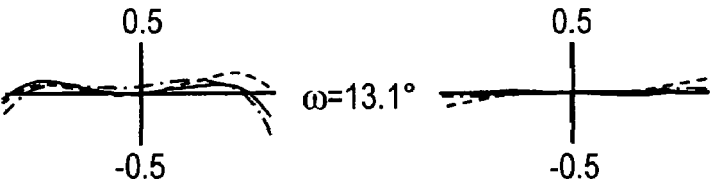
ω=13.1°
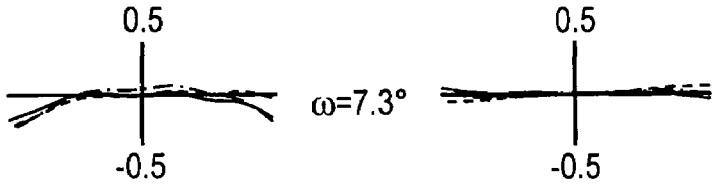
ω=7.3°
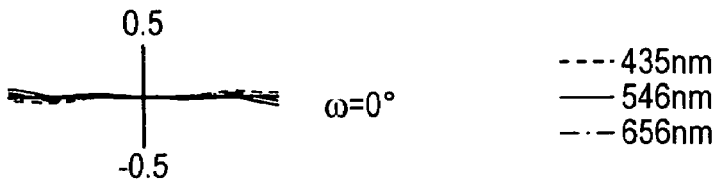
ω=0°
---- 435nm
—— 546nm
—·— 656nm

VARIABLE-POWER IMAGING OPTICAL SYSTEM AND IMAGING DEVICE

BACKGROUND OF THE INVENTION

1. Field of the Invention

The present invention relates to a three-group zoom lens adapted to form an image on a CCD or CMOS imaging device, and more particularly to a simple-structured variable-power imaging optical system to be suitably used for a digital or video camera.

2. Description of Related Art

The digital cameras, recently in rapid spread, use three-group zoom lenses in order to achieve compactness and aberration correction. Particularly, frequently used are the rear-focusing three-group zoom lenses adapted to move the final lens group forward (e.g. JP-A-10-133115, JP-A-2001-296476 and JP-A-2005-84597).

JP-A-10-133115 discloses a three-group zoom lens which includes a first lens group having a negative refractive power, a second lens group having a positive refractive power and an aperture diaphragm, and a third lens group having a positive refractive power, in order from the object side. When zooming from the wide-angle position to the telephoto position, the first lens group is moved toward the image side and then reversed toward the object side so that a moving path of the first lens is an arc that is convex toward the image side. The second lens group is moved toward the object side monotonously. The third lens group is moved toward the object side and then reversed toward the image side so that a moving path of the third lens is an arc that is convex toward the object side.

JP-A-2001-296476 discloses a three-group zoom lens which includes a first lens group having a negative refractive power, a second lens group having a positive refractive power and a third lens group having a positive refractive power, in order from the object side. In focusing at infinity during zooming from the wide-angle position to the telephoto position, the third lens group is moved toward the image side monotonously or depicting a path that is convex toward the image side.

Meanwhile, JP-A-2005-84597 discloses a three-group zoom lens structured smaller in size, higher in variable-power and in resolution as compared to those of JP-A-10-133115 and JP-A-2001-296476. This provides a structure that, by moving the third lens group toward the object side so that a convex arc is depicted during zooming, the curvature of field can be corrected well even with a middle magnification where curvature of field is difficult to correct at a high ratio of magnification.

However, in the background art, zooming is by moving the three lens groups thus making complicate the structure and operation of the mechanism.

Recently, plastic lenses are frequently used in an attempt to reduce the cost or weight, as described in JP-A-2005-84597. On the other hand, the use of plastic lenses causes deteriorated aberrations, including spherical aberration and lateral color, resulting from a change of environment, such as temperature or humidity.

Furthermore, in the background art, a lens in focusing is moved forward great in amount. Thus, there has been a desire for a three-group zoom lens capable of reducing the device thickness by reducing the movement of the focusing lens group and hence the lens overall length.

SUMMARY OF THE INVENTION

An object of an illustrative, non-limiting embodiment of the present invention is to provide a variable-power imaging optical system that is simple in lens arrangement with three groups and six lenses and easy to operate for zooming, wherein aberrations can be corrected well, and to provide an imaging device using the same.

Another object of an illustrative, non-limiting embodiment of the present invention is to provide a variable-power imaging optical system reduced in lens overall length by reducing the lens movement in focusing, and to provide an imaging device using the same.

According to a first aspect of the present invention, there is provided a variable-power imaging optical system including: in order from an object side thereof, a first lens group having a negative refractive power, a second lens group having a positive refractive power and a third lens group for correcting aberration, the first lens group including a first lens $L_1$ of a negative lens, and a second lens $L_2$ of a positive lens, in this order from the object side;

the second lens group including a third lens $L_3$ of a positive lens, a fourth lens $L_4$ of a negative lens, and a fifth lens $L_5$ for correcting aberration, the fifth lens $L_5$ having an aspheric surface, in this order from the object side;

the third lens group including a sixth lens $L_6$ for correcting aberration;

wherein zooming is performed by moving at least the first and second lens groups along an optical axis independently from each other; and Conditional Expressions (1) to (3) below is satisfied:

$$Ng2 > 1.6 \quad (1)$$

Ng2: refractive index of the second lens $L_2$, $$vg2 < 29 \quad (2)$$

vg2: Abbe number of the second lens $L_2$, and $$TL/YIM < 11.0 \quad (3)$$

TL: maximum lens-system overall length, and
YIM: image height (a half length of a diagonal line).

In the first aspect, focusing may be performed by moving the first and second lens groups jointly along the optical axis.

In the first aspect, the first lens $L_1$ may be a glass lens in a meniscus form having a convex surface on the object side, both surfaces of the glass lens being spherical, and the second lens $L_2$ may be a plastic lens having an aspheric convex surface on the object side.

In the first aspect, the third lens $L_3$ and the fourth lens $L_4$ each may be a glass lens, both surfaces of the glass lens being spherical, and the third lens $L_3$ and the fourth lens $L_4$ may be cemented together.

In the first aspect, the third lens $L_3$ may be a double-convex lens.

In the first aspect, the sixth lens $L_6$ may be a positive plastic lens having an aspheric surface, and Conditional Expression (4) below may be satisfied:

$$|fps/ft| > 0.6 \quad (4)$$

fps: minimal one of focal lengths of the plastic lenses, and
ft: combined focal length of the entire lens system (the variable-power imaging optical system) in a telephoto position.

Furthermore, Conditional Expression (5) below may be satisfied:

$$|Pp_{12} \times ft| < 1.0 \tag{5}$$

$Pp_{12}$: sum of reciprocals of focal lengths of the plastic lenses included in the first and second lens groups ($Pp_{12} \times ft = \Sigma ft/fpi$; fpi is a focal length of the i-th plastic lens), and ft: combined focal length of the entire lens system in a telephoto position.

According to a second aspect of the present invention, there is provided a variable-power imaging optical system including: in order from an object side thereof, a first lens group having a negative refractive power, a second lens group having a positive refractive power and a third lens group for correcting aberration;

the first lens group including a first lens $L_1$ of a negative lens, and a second lens $L_2$ of a positive lens, in this order from the object side;

the second lens group including a third lens $L_3$ of a positive lens, a fourth lens $L_2$ of a negative lens, and a fifth lens $L_5$ for correcting aberration, the fifth lens $L_5$ having an aspheric surface, in this order from the object side;

the third lens group including a sixth lens $L_6$ for correcting aberration;

the first lens $L_1$ being a glass lens, the second lens being a plastic lens having an aspheric convex surface on the object side, the third lens $L_3$ being a double-convex glass lens, both surfaces of the double-convex glass lens being spherical, the fifth lens $L_5$ being a plastic lens in a meniscus form having at least one aspheric surface, and the sixth lens L6 being a positive lens;

wherein zooming is performed by moving at least the first and second lens groups along an optical axis independently from each other; and Conditional Expressions (6) and (7) below is satisfied:

$$|fg2/f1g| > 1.8 \tag{6}$$

fg2: focal length of the second lens L2, and f1g: combined focal length of the first lens group in its entirety, $$Xp < 73 \tag{7}$$

Xp: value of Np2×Np2×vp2, provided that a plastic material of the second lens $L_2$ has a refractive index Np2 and an Abbe number vp2.

In the second aspect, both surfaces of the first lens $L_1$ may be spherical, and the second lens $L_2$ may satisfy Conditional Expression (8) below:

$$fg2/fw > 3.8 \tag{8}$$

fw: combined focal length of the entire lens system in a wide-angle position.

In the second aspect, both surfaces of the fourth lens $L_4$ may be spherical, and Conditional Expression (9) below may be satisfied:

$$|f2gp/f2g| > 1.2 \tag{9}$$

f2gp: focal length of a plastic lens in the second lens group, f2g: combined focal length of the second lens group.

According to a third aspect of the present invention, there is provided a variable-power imaging optical system including: in order from an object side thereof, a first lens group having a negative refractive power, a second lens group having a positive refractive power and a third lens group for correcting aberration;

the first lens group including a first lens $L_1$ of a negative lens, and a second lens $L_2$ of a positive lens, in this order from the object side;

the second lens group including a third lens $L_3$ of a positive lens, a fourth lens $L_2$ of a negative lens, and a fifth lens $L_5$ for correcting aberration, the fifth lens $L_5$ having an aspheric surface, in this order from the object side;

the third lens group including a sixth lens $L_6$ for correcting aberration;

the three lens groups each including a plastic lens;

wherein zooming is performed by moving at least the first and second lens groups along an optical axis independently from each other;

focusing may be performed by moving the first and second lens groups jointly along the optical axis; and Conditional Expressions (10) to (12) below is satisfied:

$$|f2gp/f2g| > 1.2 \tag{10}$$

f2gp: focal length of the plastic lens in the second lens group, and f2g: combined focal length of the second lens group, $$|Pp_{12} \times ft| < 1.0 \tag{11}$$

$Pp_{12}$: sum of reciprocals of focal lengths of the plastic lenses included in the first and second lens groups ($Pp_{12} \times ft = \Sigma ft/fpi$; fpi is a focal length of the i-th plastic lens), and ft: combined focal length of the entire lens system in a telephoto position, $$Xp < 73.0 \tag{12}$$

Xp: value of Np2×Np2×vp2, provided that a plastic material of the plastic lens in the first lens group has a refractive index Np2 and an Abbe number vp2.

In the third aspect, the plastic lens in the second lens group may be the fifth lens L5.

According to a fourth aspect of the present invention, there is a variable-power imaging optical system including: in order from an object side thereof, a first lens group having a negative refractive power, a second lens group having a positive refractive power and a third lens group for correcting aberration;

the first lens group including a first lens $L_1$ of a negative lens, and a second lens $L_2$ of a positive lens, in this order from the object side;

the second lens group including a third lens $L_3$ of a positive lens, a fourth lens $L_2$ of a negative lens, and a fifth lens $L_5$ for correcting aberration, the fifth lens $L_5$ having an aspheric surface, in this order from the object side;

the third lens group including a sixth lens $L_6$ for correcting aberration;

the first lens $L_1$ having a convex surface on the object side, the second lens $L_2$ having an aspheric convex surface on the object side, and the third lens $L_3$ being a double-convex lens, both surfaces of the double-convex lens being spherical;

wherein zooming is performed by moving at least the first and second lens groups along an optical axis independently from each other; and Conditional Expressions (13) to (15) below are satisfied:

$$Ng2 > 1.6 \tag{13}$$

Ng2: refractive index of the second lens $L_2$, $$vg2 < 29 \tag{14}$$

vg2: Abbe number of the second lens $L_2$, and $$0.23 \leq Ds/D \leq 0.5 \tag{15}$$

Ds: spacing between the fourth lens $L_4$ and the fifth lens $L_5$, and

D: distance along the optical axis between a lens surface of the second lens group closest to the object side and a lens surface thereof closest to an image side of the variable-power imaging optical system.

In the fourth aspect, the first lens $L_1$ may be a glass lens in a negative meniscus form, both surfaces of the glass lens being spherical, the second lens may be a plastic lens, the third and fourth lenses $L_3$, $L_4$ each may be a glass lens, both surfaces of the glass lens being spherical, the third and fourth lenses $L_3$, $L_4$ may be cemented together, and the fifth lens $L_5$ may be a plastic lens.

In the fourth aspect, the sixth lens $L_6$ may be a positive plastic lens, focusing may be performed by moving the first and second lens groups jointly, and Conditional Expression (16) below may be satisfied:

$$|fps/ft|>0.6 \qquad (16)$$

fps: minimal focal lengths of the plastic lenses, and ft: combined focal length of the entire lens system in a telephoto position.

In the fourth aspect, Conditional Expression (17) below may be satisfied:

$$|Pp_{12} \times ft|<1.0 \qquad (17)$$

$Pp_{12}$: sum of reciprocals of focal lengths of the plastic lenses included in the first and second lens groups G1, G2 ($Pp_{12} \times ft = \Sigma ft/fpi$; fpi is a focal length of the i-th plastic lens), and ft: combined focal length of the entire lens system in a telephoto position.

According to another aspect of the present invention, there is provided an imaging device including a variable-power imaging optical system according to any one of those described and a solid-state imaging element that captures an image of a subject focused by the variable-power imaging optical system.

BRIEF DESCRIPTION OF THE DRAWINGS

The features of the invention will appear more fully upon consideration of the exemplary embodiment of the invention, which are schematically set forth in the drawings, in which:

FIG. 6 shows aberrations (spherical aberration, astigmatism and distortion) on the variable-power imaging optical system of the example 1, in the wide-angle and telephoto positions thereof;

FIG. 7 shows aberrations (spherical aberration, astigmatism and distortion) on the variable-power imaging optical system of the example 2, in the wide-angle and telephoto positions thereof;

FIG. 8 shows aberrations (spherical aberration, astigmatism and distortion) on the variable-power imaging optical system of the example 3, in the wide-angle and telephoto positions thereof;

FIG. 9 shows aberrations (spherical aberration, astigmatism and distortion) on the variable-power imaging optical system of the example 4, in the wide-angle and telephoto positions thereof;

FIG. 10 shows aberrations (spherical aberration, astigmatism and distortion) on the variable-power imaging optical system of the example 5, in the wide-angle and telephoto positions thereof;

FIG. 11 shows a lateral color on the variable-power imaging optical system of the example 1, in the wide-angle and telephoto positions thereof;

FIG. 13 shows a lateral color on the variable-power imaging optical system of the example 3, in the wide-angle and telephoto positions thereof;

FIG. 14 shows a lateral color on the variable-power imaging optical system of the example 4, in the wide-angle and telephoto positions thereof; and FIG. 15 shows a lateral color on the variable-power imaging optical system of the example 5, in the wide-angle and telephoto positions thereof.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, six lenses are arranged with three groups. Zooming is performed by moving at least the first and second lens groups along the optical axis independently from each other. Furthermore, Conditional Expressions are satisfied structurally. This simplifies the lens arrangement and zooming mechanism, thus making it possible to favorably correct for aberrations.

Meanwhile, focusing is structurally by moving the first and second lens groups jointly along the optical axis. This can reduce the lens overall length by reducing the advancing amount of the lens during focusing.

Figure 1:
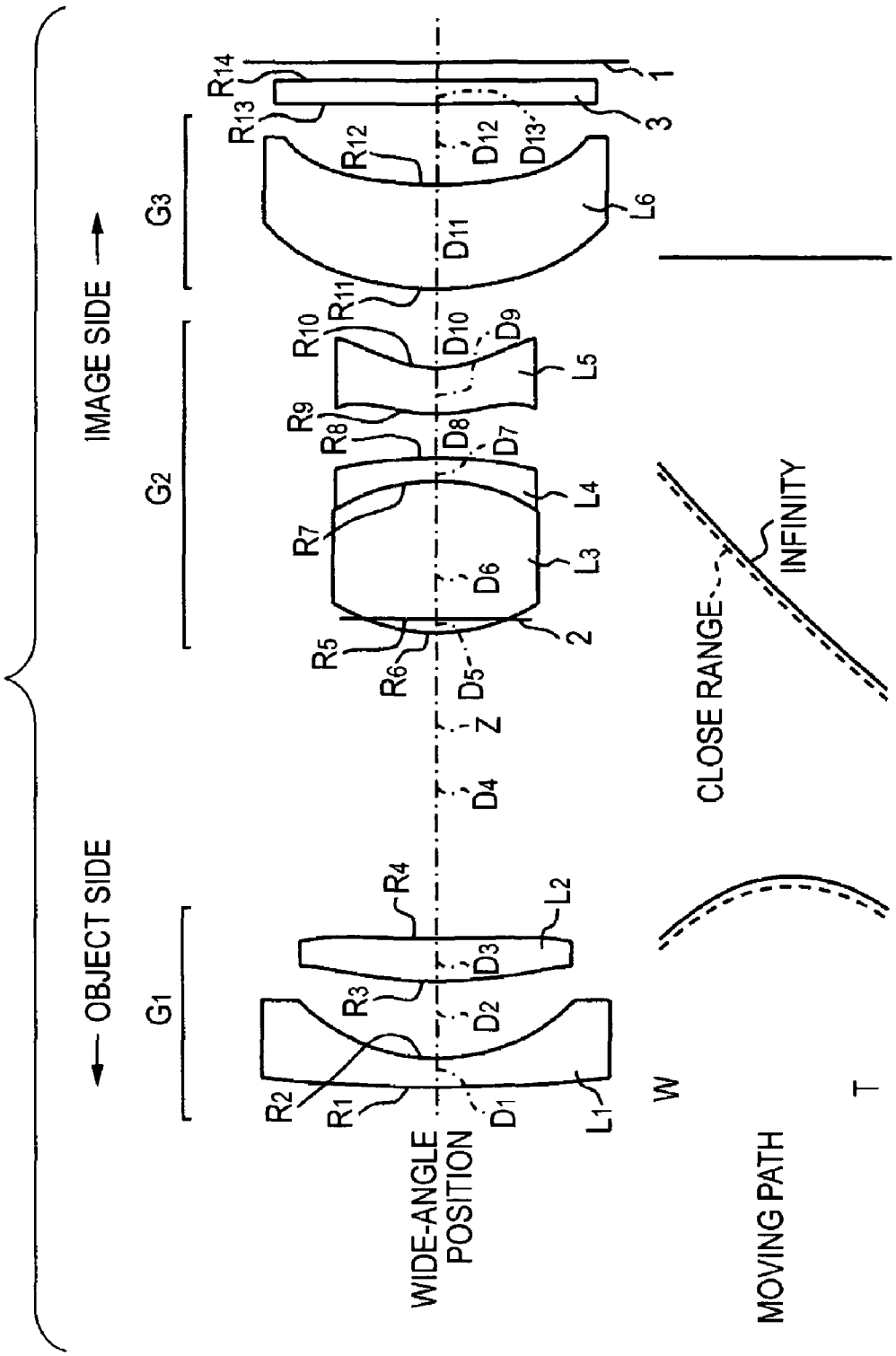
FIG. 1 shows a lens arrangement of a variable-power imaging optical system according to an example 1 of the invention.

Using FIG. 1 as a representative figure, description will be now made on exemplary embodiments of a variable-power imaging optical system and an imaging device using the same.

FIG. 1 shows a lens arrangement of a variable-power optical system according to example 1 of the present invention, wherein a lens arrangement in a wide-angle position is shown in the upper part thereof while the moving paths of lens groups, of from the wide-angle position (W) to the telephoto position (T), are shown in the lower part thereof.

The variable-power imaging optical system, in a first embodiment of the invention, includes a first lens group $G_1$ having a negative refractive power, a second lens group $G_2$ having a positive refractive power and an aperture stop 2 for regulating the amount of light, and a third lens group G3 for correcting aberration, that are arranged in order from the object side, as shown in FIG. 1.

During zooming from the wide-angle position toward the telephoto position, the lens groups are moved in the manner as follows. Namely, the first lens group $G_1$ is moved toward the image side and then reversed in movement toward the object side, so that an arc convex toward the image side is depicted. The second lens group $G_2$ is moved monotonously toward the object side while the third lens group $G_3$ is held stationary.

Meanwhile, when focusing from the infinity toward a close range, the first and second lens groups $G_1$, $G_2$ are moved jointly toward the object side.

By thus using only the two lens groups $G_1$, $G_2$ to move along the optical axis Z, zooming and focusing can be effected with efficiency.

As noted before, where the aperture stop 2 is arranged in a lens group, spherical aberration can be corrected well at both front and rear of the aperture stop 2 rather than the arrangement thereof between the lens groups, thus making it easy to correct aberration. This also provides comparatively margins for the characteristics on the axis and around the screen.

Because focusing is by moving the first and second lens groups $G_1$, $G_2$ jointly with each other over the equal distance, control of drive can be made easy upon focusing. Meanwhile, because the focusing amount in each zoom position is given constant for a distance to the object, it is possible to minimize the sum of the maximum advancing amount of from the infinity status in the wide-angle position and the maximum advancing amount of from the infinity status in the telephoto position. This is advantageous for reducing the lens overall length.

Namely, for the variable-power imaging optical system of example 1, the zooming with a focus at infinity is depicted with a moving path in a solid line of the lens group from the wide-angle position (W) to the telephoto position (T), as shown in the lower part of FIG. 1. Meanwhile, the zooming with a focus at the close rage is depicted with a moving path in a broken line of from the wide-angle position (W) to the telephoto position (T) of the first and second lens groups $G_1$, $G_2$ (this is true for those in FIGS. 2 to 4 respectively showing example 2 to 4). In this manner, regardless of zoom position, the focusing lens has a constant advancing amount of from the reference position (infinity) to a position to the object, thus reducing the lens overall length.

Between a third lens group $G_3$ and an image plane (CCD image plane) 1, there is arranged a filter component 3 including a low-pass filter and an infrared-ray blocking filter.

The first lens group G1 includes a first lens $L_1$ having a negative lens whose concave surface is directed toward the image side and a second lens $L_2$ having a positive lens made aspheric at least in one surface and for correcting aberration, in this order from the object.

By structuring the first lens group $G_1$ like this, curvature-of-field, distortion, etc. can be corrected favorably. While improving the resolution, thickness can be reduced as to the entire lens system and the lens barrel nested, thus achieving compactness.

Meanwhile, the second lens group $G_2$ includes a double-convex third lens $L_3$ having an light-regulating aperture stop 2 arranged within the lens thereof, a fourth lens $L_4$ having a negative lens whose concave surface is directed toward the object side, and an aberration-correcting fifth lens $L_5$ made aspheric at least in one surface, in this order from the object side. The third lens $L_3$ and the fourth lens $L_4$ are provided as a cemented lens in which lens surfaces are cemented with each other (however, the third and fourth lenses $L_3$, $L_4$ are independent mutually, in example 2). The third lens $L_3$ preferably has an aspheric surface, in which case forming can be by glass molding. Such an aspheric surface can be configured by a combined aspheric surface.

By thus structuring the second lens group $G_2$, spherical aberration can be corrected well. While improving the resolution, thickness can be reduced as to the entire lens system and the lens barrel nested, thus achieving compactness.

Meanwhile, the third lens group $G_3$ includes an aberration-correcting sixth lens $L_6$ made aspheric at least in one surface thereof.

By thus structuring the third lens group $G_3$, compactness can be achieved while suppressing the variation of aberration upon zooming.

Furthermore, the first embodiment is structured satisfying the following Conditional Expressions (1), (2) and (3).

$$Ng_2 > 1.6 \quad (1)$$

$Ng_2$: refractive index of the second lens $L_2$ $$vg_2 > 1.6 \quad (2)$$

$vg_2$: Abbe number of the second lens $L_2$ $$TL/YIM < 11.0 \quad (3)$$

TL: maximum length of the entire lens system (overall length of the lens system in the maximum advancement)

YIM: image height (a half length of the diagonal line).

The Conditional Expressions (1), (2) indicate the range of a refractive index and an Abbe number of a material of the second lens $L_2$ (the range of dispersion). By satisfying the two Conditional Expressions, matching is obtained well with the surrounding lenses having comparatively high refractive indexes, thus making aberrations and resolution characteristics well.

The Conditional Expression 3 defines the range that satisfactory compactness is obtainable even at the maximum advancement of the lens system.

Namely, by satisfying the three Conditional Expressions at the same time, aberrations and resolution characteristics can be provided favorable while achieving the compactness of the lens system.

In order to make well the lateral color (chromatic aberration) in the first lens group G1, the following Conditional Expression (19) is preferably satisfied.

$$vg_1 - vg_2 > 22 \quad (19)$$

$vg1$: Abbe number of the first lens $L_1$
$vg2$: Abbe number of the second lens $L_2$ Here, the first lens $L_1$ is preferably a meniscus-formed glass lens made spherical at both surfaces whose convex surface is directed toward the object side. The second lens $L_2$ is preferably a plastic lens whose aspheric, convex surface is directed toward the object.

Where zooming is effected by moving the first and second lens groups $G_1$, $G_2$ as described above, setting is made to increase the power for the first and second lens groups $G_1$, $G_2$. Accordingly, in order to decrease the lens overall length while using a plastic lens, there is a need of setting to suppress small the focal shift due to a change of temperature, etc. wherein the focusing lens group even if small in movement is to greatly correct a focal shift on an image plane. In this case, the plastic lenses included in the first and second lens groups $G_1$, $G_2$ have a great effect upon a focal shift due to temperature change, etc. The plastic lens is desirably provided the lowest in power among those in the lens group.

For this reason, the first lens group $G_1$ includes a first lens $L_1$ of a negative glass lens and a second lens $L_2$ of a positive plastic lens having an aspheric surface at least any of the surfaces, in this order from the object side. This can reduce the power that the plastic lens is to bear as compared to the case the first lens $L_1$ is made as a plastic lens. By reducing the change of power as to the first lens $L_1$ overall depending upon temperature, etc., it is possible to make up a lens that is small in focal shift, in effective diameter change of the first lens group $G_1$, in overall length and in the outer diameter of the first lens group $G_1$. Meanwhile, by making the second lens $L_2$ as a plastic lens, it is possible to reduce the change of the effective diameter at between the wide-angle position and the telephoto position, and hence to reduce the variation in the spherical aberration due to a temperature change, etc.

Preferably, the third and fourth lenses $L_3$, $L_4$ each is preferably a glass lens made spherical at the both surfaces.

The third lens $L_3$ may be a double-convex lens.

Preferably, the sixth lens $L_6$ is a positive plastic lens having an aspheric surface, and further the following Conditional Expression (4) is satisfied.

$$|fps/ft|>0.6 \qquad (4)$$

fps: minimal one of plastic-lens focal lengths, and ft: combined focal length of the entire lens system in the telephoto position.

The Conditional Expression (4) defines a ratio of the minimal one of plastic-lens focal lengths to the focal length of the entire lens system in the telephoto position.

The plastic lens is greater in power change with an environment change, such as of temperature or humidity, as compared to the glass lens. Meanwhile, in the zoom lens, the lens groups relatively change in position upon zooming. Thus, the curvature of field changes with a change of environment, such as temperature or humidity, thus changing the resolution greatly in the periphery.

Accordingly, by satisfying the Conditional Expression 4, setting is made to provide the plastic lens with a focal length of a value or greater in each of the lens group, i.e. to provide the plastic lens with a power of a value or smaller in each of the lens groups. This suppresses the amount of curvature of field from changing with an environment change, such as of temperature or humidity, thus suppressing the resolution in the peripheral region from changing.

Preferably, the following Conditional Expression (5) is satisfied (satisfied only in examples 1, 3, 4 and 5).

$$|Pp_{12} \times ft|<1.0 \qquad (5)$$

$Pp_{12}$: sum of the reciprocals of focal lengths of the plastic lenses included in the first and second lens groups G1, G2 ($Pp_{12} \times ft = \Sigma ft/fpi$; fpi is a focal length of the i-th plastic lens), and ft: combined focal length of the entire lens system in the telephoto position.

The Conditional Expression (5) defines a range of a product between the sum of the reciprocals of focal lengths of the plastic lenses included in the first and second lens groups $G_1$, $G_2$ and the focal length of the entire lens system in the telephoto position.

In the variable-power imaging optical system of this embodiment, the first and second lens groups $G_1$, $G_2$ are arranged to move during zooming, i.e. the first and second lens group $G_1$, $G_2$ are set up to have an increased power. Accordingly, the plastic lenses included in the first and second lens groups $G_1$, $G_2$ have a power whose magnitude has a great effect upon the focal shift due to a change of environment, such as of temperature or humidity. For this reason, by satisfying the Conditional Expression (5), suppressed is the focal deviation due to the change of environment, such as of temperature and humidity, thus reducing the travel of the lens groups during focusing.

From such a viewpoint, preferably the following Conditional Expression (5') is satisfied in place of the Conditional expression (5) (satisfied only in example 3).

$$|Pp_{12} \times ft|<0.1 \qquad (5')$$

Description is now made on a variable-power imaging optical system according to a second embodiment of the invention.

The variable-power imaging optical system of the second embodiment is much duplicated in structure with the variable-power imaging optical system of the first embodiment, the characteristic matters of which only are described below.

Namely, the variable-power imaging optical system of the second embodiment includes a first lens group $G_1$ having a negative refractive power, a second lens group $G_2$ having a positive refractive power, and a third lens group $G_3$ for aberration correction, in this order from the object side. The first lens group $G_1$ includes a first lens $L_1$ of a negative lens and a second lens $L_2$ of a positive lens, in this order from the object side. The second lens group $G_2$ includes a third lens $L_1$ of a positive lens, a fourth lens $L_4$ of a negative lens, and a fifth lens $L_5$ having an aspheric surface and for aberration correction, in this order from the object side. The third lens group $G_3$ includes a sixth lens $L_6$ for aberration correction.

The first lens $L_1$ is a glass lens. The second lens $L_2$ is a plastic lens having an aspheric convex surface directed toward the object side. The third lens $L_3$ is a double-convex glass lens made spherical at the both surfaces. The fifth lens $L_5$ is a plastic lens in a meniscus form made aspheric at any one surface thereof. The sixth lens $L_6$ is a positive lens.

Zooming is by moving the first and second lens groups $G_1$, $G_2$ along the optical axis independently from each other.

Furthermore, the following Conditional Expressions (6), (7) are satisfied structurally.

$$|fg2/f1g|>1.8 \qquad (6)$$

fg2: focal length of the second lens $L_2$, and f1g: combined focal length of the first lens group $G_1$ entirety.

$$Xp<73.0 \qquad (7)$$

Xp: value of $Np2 \times Np2 \times vp2$, provided that the second lens $L_2$ is of a plastic material having a refractive index Np2 and an Abbe number vp2.

The plastic lens has a greater change in power with a change of environment, such as of temperature or humidity, as compared to the glass lens. For this reason, the first lens group $G_1$ includes a first lens $L_1$ of a negative glass lens, and a second lens of a positive plastic lens made aspheric as least any one surface thereof.

By satisfying the Conditional Expression (6), the power that the plastic lens is to bear is reduced as compared to the case with a plastic lens for the first lens $L_1$. Furthermore, by reducing the power change resulting from the temperature, etc. of the first lens group $G_1$ entirety, it is possible to make up a lens that is small in focal shift, in effective diameter change of the first lens group $G_1$, in overall length and in the outer diameter of the first lens group $G_1$. Meanwhile, by making the second lens $L_2$ by a plastic lens, it is possible to reduce the change of the effective diameter in between the wide-angle position and the telephoto position, and hence to reduce the variation in the spherical aberration due to a temperature change, etc.

The Conditional Expression (7) defines the condition for specifying the range where lateral color can be corrected favorably for the first lens group $G_1$. This is effective in correcting the lateral color due to using the plastic lens for the second lens $L_2$ of the first lens group $G_1$.

In the conventional plastic material having a refractive index of 1.6 or smaller, internal distortion is excessively great when actually used as a lens, thus causing a great birefringence and hence a difficulty in achieving a high resolution.

However, there have recently been developed those smaller in internal distortion even of a plastic material having a refractive index of 1.6 or greater. The present inventor has conceived the use of such a plastic material smaller in internal distortion. Because the range of such a plastic material smaller in internal distortion can be specified under the Conditional Expression (7), lateral color can be made favorable by structurally satisfying the Conditional Expression (7).

From such a viewpoint, preferably the following Conditional Expression (7') is satisfied in place of the Conditional Expression (7) (satisfied only in examples 1, 3, 4 and 5).

$$Xp<70.0 \tag{7'}$$

More preferably, the following Conditional Expression (7") is satisfied (satisfied only in example 5).

$$Xp<69.0 \tag{7"}$$

Incidentally, the material satisfying the Conditional Expression (7) or (7') can be applied for another lens (e.g. the fourth lens $L_4$, the fifth lens $L_5$, the sixth lens $L_6$ or the like).

Preferably, the first lens $L_1$ is made spherical at both surfaces while the second lens satisfies the following Conditional Expression (8) (satisfied only in examples 1, 2, 3 and 4).

$$fg2/fw>3.8 \tag{8}$$

fg2: focal length of the second lens $L_2$, and
fw: combined focal length of the entire lens system in the wide-angle position.

The Conditional Expression (8) defines the combined focal length of the entire lens system in the wide-angle end, relative to the focal length of the second lens $L_2$. In case going below the lower limit of the Conditional Expression, the spherical aberration is excessively low at high temperature in the wide-angle position, to lower the performance in the focal region overall.

The fourth lens $L_4$ is preferably made spherical at both surfaces, and the following Conditional Expression (9) is preferably satisfied.

$$|f2gp/f2g|>1.2 \tag{9}$$

f2gp: focal length of the plastic lens in the second lens group $G_2$, and
f2g: combined focal length of the second lens group G2.

In the zoom lens, because the relative position of lens groups changes during zooming, the curvature of field changes with a change of environment, such as of temperature or humidity, thus greatly changing the resolution in the peripheral region. In order to reduce to a possible small extent the change of curvature of field in each position due to a change of environment, such as of temperature or humidity, it is effective to increase the ratio of the focal length of the plastic lens of the second lens group $G_2$ to the combined focal length in the second lens group $G_2$ greatest in movement amount. Accordingly, by satisfying the conditional expression 9, reduced is the change of curvature of field due to a change of environment, such as temperature and humidity.

From such a viewpoint, preferably the following Conditional Expression (9') is satisfied in place of the Conditional Expression 9 (satisfied only in examples 1, 3 and 4).

$$|f2gp/f2g|>2.0 \tag{9'}$$

More preferably, the following Conditional Expression (18) is satisfied.

$$f3G/fw>1.8 \tag{18}$$

f3G: focal length of the third lens group $G_3$
fw: combined focal length of the entire lens system in the wide-angle position.

The Conditional Expression 18 defines the power of the sixth lens $L_6$ constituting the third lens group $G_3$. In case going below the lower limit thereof, the angle of exit is excessively greater in the wide-angle position.

Description is now made on a variable-power imaging optical system according to a third embodiment of the invention.

The variable-power imaging optical system of the third embodiment is also much duplicated in structure with the variable-power imaging optical system of the first embodiment, the characteristic matters of which only are described below. Note that the present embodiment does not include the structure of example 3 given later.

Namely, the variable-power imaging optical system of the third embodiment includes a first lens group $G_1$ having a negative refractive power, a second lens group $G_2$ having a positive refractive power, and a third lens group $G_3$ for aberration correction, in this order from the object side. The first lens group $G_1$ includes a first lens $L_1$ of a negative lens and a second lens $L_2$ of a positive lens, in this order from the object side. The second lens group $G_2$ includes a third lens L1 of a positive lens, a fourth lens $L_4$ of a negative lens, and a fifth lens $L_5$ having an aspheric surface and for aberration correction, in this order from the object side. The third lens group $G_3$ includes a sixth lens $L_6$ for aberration correction.

Plastic lenses are arranged respectively for the three lens groups.

Zooming is by moving the first and second lens groups $G_1$, $G_2$ along the optical axis independently from each other.

Focusing is by moving the first and second lens groups $G_1$, $G_2$ jointly along the optical axis.

Furthermore, the following Conditional Expressions (10), (11) are satisfied structurally (satisfied only in examples 1, 3, 4 and 5).

$$|fg2/f2g|>1.2 \tag{10}$$

f2gp: focal length of the plastic lens of the second lens group $G_2$, and
f2g: combined focal length of the second lens group G2.

$$|Pp_{12} \times ft|<1.0 \tag{11}$$

$Pp_{12}$: sum of the reciprocals of focal lengths of the plastic lenses included in the first and second lens groups $G_1$, $G_2$ ($Pp_{12} \times ft = \Sigma ft/fpi$; fpi is a focal length of the i-th plastic lens), and
ft: combined focal length of the entire lens system in the telephoto position.

$$Xp<73.0 \tag{12}$$

Xp: value of Np2×Np2×vp2, provided that the second lens $L_2$ is of a plastic material having a refractive index Np2 and an Abbe number vp2.

The Conditional Expression (10) is similar in significance to the Conditional Expression (9), the Conditional Expression (11) is similar in significance to the Conditional Expression (5), and the Conditional Expression (12) is similar in significance to the Conditional Expression (7).

Preferably, the following Conditional Expression (10') is satisfied in place of the Conditional Expression (10) (satisfied only in examples 1, 3 and 4).

$$|f2gp/f2g|>2.0 \tag{10'}$$

Preferably, the following Conditional Expression (11') is satisfied in place of the Conditional Expression (11) (satisfied only in example 3).

$$|Pp_{12} \times ft|<0.1 \tag{11'}$$

Preferably, the following Conditional Expression (12') is satisfied in place of the Conditional Expression (12) (satisfied only in examples 1, 3, 4 and 5).

$$Xp<70.0 \qquad (12')$$

More preferably, the following Conditional Expression (12") is satisfied (satisfied only in example 5).

$$Xp<69.0 \qquad (12'')$$

Preferably, the plastic lens in the first lens group $G_1$ is the second lens $L_2$ while the plastic lens in the second lens group $G_2$ is the fifth lens $L_5$.

Description is now made on a variable-power imaging optical system according to a fourth embodiment of the invention.

The variable-power imaging optical system of the fourth embodiment is also much duplicated in structure with the variable-power imaging optical system of the first embodiment, the characteristic matters of which only are described below.

Namely, the variable-power imaging optical system of the fourth embodiment includes a first lens group $G_1$ having a negative refractive power, a second lens group $G_2$ having a positive refractive power, and a third lens group $G_3$ for aberration correction, in this order from the object side. The first lens group $G_1$ includes a first lens $L_1$ of a negative lens and a second lens $L_2$ of a positive lens, in this order from the object side. The second lens group $G_2$ includes a third lens $L_1$ of a positive lens, a fourth lens $L_4$ of a negative lens and a fifth lens $L_5$ having an aspheric surface and for aberration correction, in this order from the object side. The third lens group $G_3$ includes a sixth lens $L_6$ for aberration correction.

The first lens $L_1$ has a convex surface directed toward the object side, the second lens $L_2$ has an aspheric convex surface directed toward the object side, and the third lens $L_3$ is a double-convex lens made spherical at both surfaces.

Zooming is by moving the first and second lens groups $G_1$, $G_2$ along the optical axis independently from each other.

Furthermore, the following Conditional Expressions (13), (14) and (15) are satisfied structurally. Incidentally, the Conditional Expression (15) is satisfied only in examples 3, 4 and 5.

$$Ng2>1.6 \qquad (13)$$

Ng2: refractive index of the second lens $L_2$, $$vg2<29 \qquad (14)$$

vg2: Abbe number of the second lens $L_2$ $$0.23 \leq Ds/D \leq 0.5 \qquad (15)$$

Ds: spacing between the fourth lens $L_4$ and the fifth lens $L_5$

D: distance along the optical axis between the lens surface of the second lens group $G_2$ closest to the object side to the lens surface thereof closest to the image side.

The Conditional Expression (13) is similar in significance to the Conditional Expression (1) while the Conditional Expression (14) is similar in significance to the Conditional Expression (2). Meanwhile, the Conditional Expression (15) defines the spacing between the fourth and fifth lenses $L_4$, $L_5$ relative to the overall length of the second lens group $G_2$. In case exceeding the upper limit of the same, the second lens group $G_2$ apparently has a thickness excessively great as compared to the case with a smaller spacing, thus having an effect upon the travel (stroke) of the second lens group $G_2$. In case the stroke is excessively small, the performance in aberration deteriorates. In case to maintain the stroke, the overall length increases excessively. Meanwhile, in case going below the lower limit, there encounters a difficulty in inserting a shutter having a full function. For example, when to insert a shutter to between the lens groups, the zoom ratio decreases small excessively or the overall length increases excessively.

In order to make well the lateral color in the first lens group $G_1$, the Conditional Expression 20 is preferably satisfied.

$$vg1-vg2>22 \qquad (20)$$

vg1: Abbe number of the first lens $L_1$, and vg2: Abbe number of the second lens $L_1$.

Preferably, the first lens $L_1$ is a glass lens in a negative meniscus form made spherical at both surfaces, the second lens $L_2$ is a plastic lens, the third and fourth lenses $L_3$, $L_4$ are glass lenses each made spherical at both surfaces, and the fifth lens $L_5$ is a plastic lens.

Preferably, the sixth lens $L_6$ is formed by a positive plastic lens so that focusing can be by moving the first and second lens groups G1, G2 jointly, and further the following Conditional Expression (16) is satisfied.

$$|fps/ft|>0.6 \qquad (16)$$

fps: minimal one of plastic-lens focal lengths, and ft: combined focal length of the entire lens system in the telephoto position.

Incidentally, the Conditional Expression (16) is similar in significance to the Conditional Expression (4).

Preferably, the following Conditional Expression (17) is satisfied (satisfied only in examples 1, 3, 4 and 5)

$$|Pp_{12} \times ft|<1.0 \qquad (17)$$

$Pp_{12}$: sum of the reciprocals of focal lengths of the plastic lenses included in the first and second lens groups $G_1$, $G_2$ ($Pp_{12} \times ft = \Sigma ft/fpi$; fpi is a focal length of the i-th plastic lens), and ft: combined focal length of the entire lens system in the telephoto position.

Incidentally, the Conditional Expression (17) is similar in significance to the Conditional Expression 5.

More preferably, the following Conditional Expression (17') is satisfied (satisfied only in example 3)

$$|Pp_{12} \times ft|<0.1 \qquad (17')$$

Incidentally, the aspheric surface is expressed by the following aspheric-surface equation:

$$Z(r) = \frac{r^2/R}{1+\sqrt{1-K \times r^2/R^2}} + \sum_{i=2}^{5} A_{2i} r^{2i}$$

where

Z(r): length of the vertical line drawn from the point, on an aspheric surface distant r ($r^2=x^2+y^2$) from the optical axis, onto a tangential plane (plane vertical to the optical axis) to the apex of the aspheric surface, R: radius of curvature of the aspheric surface at around the optical axis, K: eccentricity, and $A_{2i}$: aspheric coefficient (i=2-5).

The variable-power imaging optical system can be mounted on an imaging device in various kind such as a mobile unit, e.g. digital camera or cellular phone, together with a solid-state imaging element that captures an image of a subject focused by the variable-power imaging optical system. Such an imaging device is excellent in compactness and capable of obtaining a high-resolution image in various situations.

EXAMPLE 1

Description is now made on a concrete structure of a variable-power imaging optical system according example 1 of the invention.

Explaining in detail the variable-power imaging optical system of example 1, a first lens group $G_1$ includes a first glass lens $L_1$ having a negative meniscus form having a concave surface greater in curvature directed toward the image side, and a second plastic lens $L_2$ having, around the optical axis, a positive meniscus form having a convex surface greater in curvature directed toward the object side, in this order from the object side. The second lens $L_2$ has respective surfaces made aspheric expressed by the foregoing aspheric-surface equation.

The second lens group $G_2$ includes a third glass lens $L_3$ made convex spherical at both surfaces, a fourth glass lens $L_4$ having a negative meniscus form made spherical at both surfaces, and a fifth plastic lens $L_5$ having, around the optical axis, a negative meniscus form having a convex surface directed toward the object side, in this order from the object side. The third and fourth lenses $L_3$, $L_4$ are made as a cemented lens in which those are cemented together at their lens surfaces. The fifth lens $L_5$ is made aspheric at both surfaces as expressed by the foregoing aspheric-surface equation. Incidentally, an aperture stop 2 is arranged in the third lens $L_3$.

The third lens group $G_3$ is a sixth plastic lens $L_6$ having a positive meniscus form whose convex surface is directed toward the image side, thus being made aspheric at both surfaces as expressed by the foregoing aspheric-surface equation.

Zooming is by moving the first and second lens groups $G_1$, $G_2$ along the optical axis independently from each other whereas the third lens group $G_3$ is held stationary. Focusing is by moving the first and second lens groups $G_1$, $G_2$ jointly along the optical axis whereas the third lens group $G_3$ is held stationary structurally.

In the lower part of FIG. 1, there is depicted, with solid lines, moving paths of the respective lens groups (the third lens group $G_3$ being held stationary) from the wide-angle position to the telephoto position during zooming of the variable-power imaging optical system of example 1.

The lens moving paths, depicted with the solid lines, are paths under the focusing at infinity while the lens moving paths, depicted with broken lines as to the first and second lens groups $G_1$, $G_2$, are paths under the focusing at close range.

The variable-power imaging optical system of example 1 has values that are shown in Table 1.

In the upper part of Table 1, there are shown values of a radius-of-curvature R (mm) of each lens surface, a center thickness of each lens and an air spacing D (mm) between lenses (hereinafter, those are collectively referred to as an surface-to-surface axial spacing), and a refractive index Nd and Abbe number νd at the d-line of each lens.

The numerals in the table represents the order from the object side (true for those in Tables 2, 3 and 4).

In the middle part of Table 1, there are shown variable ranges of $D_4$ and $D_{10}$ given in the column of surface-to-surface axial spacing D, in the wide angle (WIDE: ×1.0), intermediate (MIDDLE: ×1.6) and telephoto (TELE: ×2.11) positions.

In the present example, the conditional expressions (1)-(14), (16)-(20), (7'), (9'), (10') and (12') are all satisfied (note that the expressions are given equivalent between those of (1) and (13), between those of (2) and (14), between those of (4) and (16), between those of (5) and (11) and (17), between those of (7) and (12), between those of (9) and (10), between those of (19) and (20), between those of (5') and (11') and (17'), between those of (12') and (9') and (10'), and between those of (7") and (12"): (this is true for those in the other explanations in the description).

In the lower part of Table 1, there are shown the values of constants K, $A_4$, $A_6$, $A_8$ and $A_{10}$ as to the aspheric surface given in the aspheric-surface equation.

TABLE 1

| Surface | R | D | $N_d$ | $\nu_d$ |
|---|---|---|---|---|
| 1 | 636.617 | 12.03 | 1.71300 | 53.9 |
| 2 | 75.001 | 32.07 | | |
| *3 | 170.614 | 17.75 | 1.60398 | 27.2 |
| *4 | 599.737 | $D_4$ | | |
| STO 5 | ∞ | −5.73 | | |
| 6 | 74.026 | 63.26 | 1.57250 | 57.7 |
| 7 | −74.026 | 9.56 | 1.84666 | 23.8 |
| 8 | −183.297 | 18.97 | | |
| *9 | 70.749 | 19.09 | 1.50842 | 56.4 |
| *10 | 42.164 | $D_{10}$ | | |
| *11 | 131.859 | 43.13 | 1.50842 | 56.4 |
| *12 | 226.193 | 20.04 | | |
| 13 | ∞ | 9.54 | 1.51680 | 64.2 |
| 14 | ∞ | 20.96 | | |

*Aspheric surface

| | Group-to-group spacing | | |
|---|---|---|---|
| | WIDE (×1.0) | MIDDLE (×1.6) | TELE (×2.11) |
| D4 | 132.39 | 55.72 | 24.89 |
| D10 | 33.07 | 83.95 | 127.21 |

TABLE 1-continued

| | | Aspheric coefficients | | | |
|---|---|---|---|---|---|
| | K | $A_4$ | $A_6$ | $A_8$ | $A_{10}$ |
| 3 | 2.445 | $-2.073 \times 10^{-7}$ | $8.107 \times 10^{-11}$ | $-4.654 \times 10^{-14}$ | $1.626 \times 10^{-18}$ |
| 4 | 117.983 | $-3.236 \times 10^{-7}$ | $3.388 \times 10^{-12}$ | $-1.814 \times 10^{-14}$ | $-4.713 \times 10^{-18}$ |
| 9 | −11.095 | $1.113 \times 10^{-6}$ | $-3.448 \times 10^{-9}$ | $1.779 \times 10^{-12}$ | $-5.325 \times 10^{-16}$ |
| 10 | −1.010 | $-6.919 \times 10^{-7}$ | $-8.149 \times 10^{-10}$ | $3.703 \times 10^{-13}$ | $-6.788 \times 10^{-17}$ |
| 11 | 2.651 | $2.681 \times 10^{-7}$ | $-6.890 \times 10^{-11}$ | $1.726 \times 10^{-14}$ | $-1.565 \times 10^{-18}$ |
| 12 | 7.632 | $5.680 \times 10^{-7}$ | $-4.806 \times 10^{-11}$ | $4.249 \times 10^{-15}$ | $4.854 \times 10^{-18}$ |

FIG. 6 is an aberration figure illustrating aberrations (spherical aberration, astigmatism and distortion) on the variable-power imaging optical system of example 1, in the wide-angle (×1.0) and telephoto (×2.1) positions. FIG. 11 is an aberration figure illustrating lateral colors on the variable-power imaging optical system of example 1, in the wide-angle and telephoto positions.

Incidentally, the spherical-aberration figures show aberrations at 656 nm, 546 nm and 435 nm while the astigmatic-aberration figure shows aberrations at sagittal and tangential image surfaces (true for those in FIGS. 7, 8, 9 and 10). As apparent from FIGS. 6 and 11, aberrations are well corrected over the entire zoom range according to the variable-power imaging optical system of example 1.

EXAMPLE 2

Description is now made on a concrete structure of a variable-power imaging optical system according to example 2 of the invention.

Figure 2:
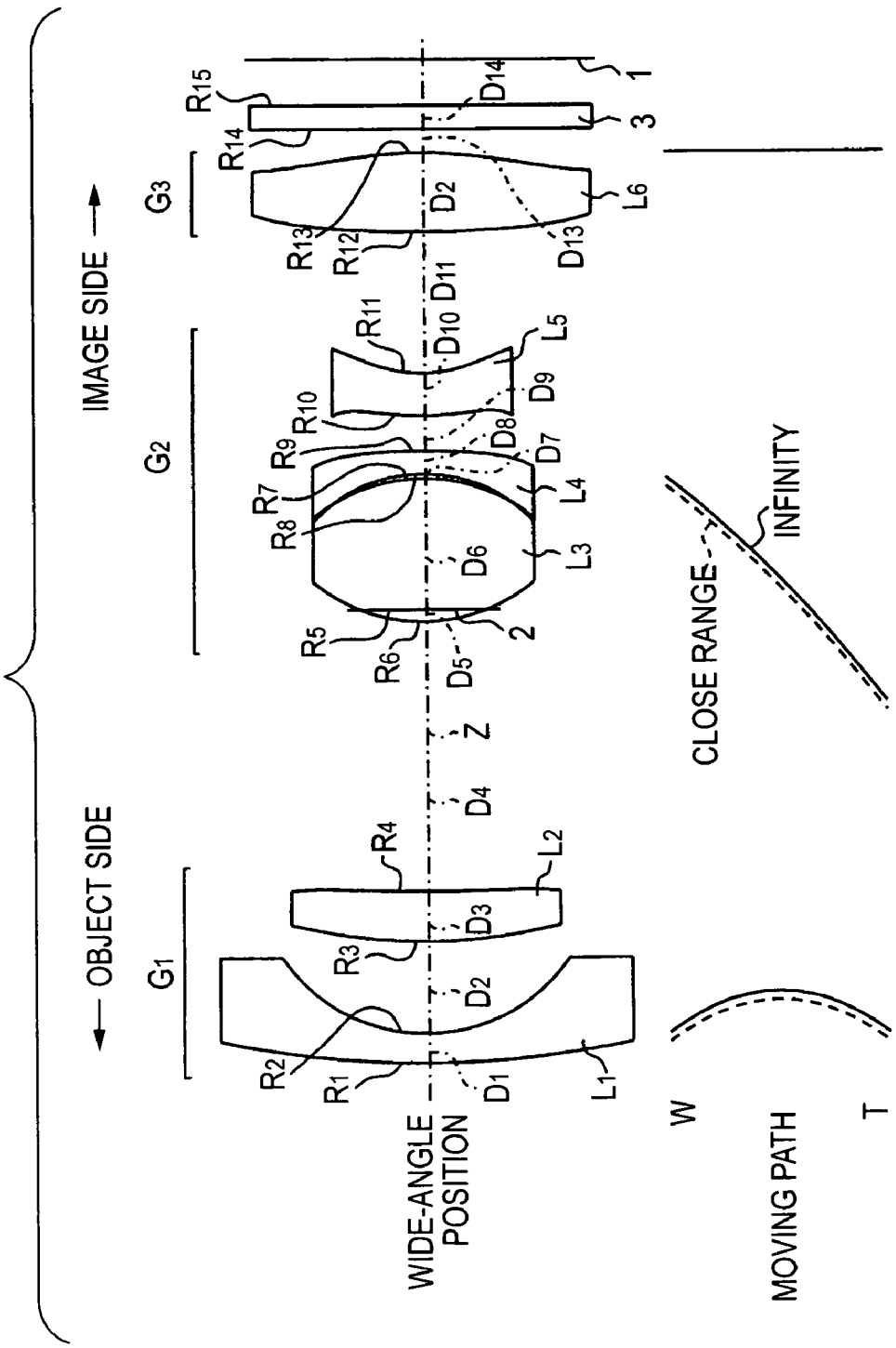
FIG. 2 shows a lens arrangement of a variable-power imaging optical system according to an example 2 of the invention.

The variable-power imaging optical system of example 2 has a lens arrangement nearly similar to that of the foregoing example 1, as shown in FIG. 2. However, there is a difference mainly in that the third and fourth lenses $L_3$, $L_4$ are both structured as single lenses, the fourth lens $L_4$ is a plastic lens whose both surfaces are made aspheric as expressed by the foregoing aspheric-surface equation, and the sixth lens $L_6$ is made generally in a double-convex form.

Incidentally, the third and fourth lenses $L_3$, $L_4$ in other examples are both made of glass because those are cemented with each other. However, the third and fourth lenses $L_3$, $L_4$ in this example are provided as separate single lenses though those are placed proximate to each other. Thus, the former can be made of glass while the latter be made of plastic. The fourth lens L4 preferably uses a material having a comparatively high refractive index, from the viewpoint of correcting for lateral aberration. The plastic material uses a material comparatively high in refractive index of 1.6 or greater but low in internal strain.

The variable-power imaging optical system of example 2 has values that are shown in Table 2.

In the upper part of Table 2, there are shown values of a radius-of-curvature R (mm) of each lens surface, a surface-to-surface axial spacing D (mm) of lenses, and a refractive index $N_d$ and Abbe number $v_d$ at the d-line of each lens.

In the middle part of Table 2, there are shown variable ranges of $D_4$ and $D_{10}$ given in the column of surface-to-surface axial spacing D, in the wide angle (WIDE: ×1.0), intermediate (MIDDLE: ×1.5) and telephoto (TELE: ×2.11) positions.

In the present example, the conditional expressions (1)-(4), (6)-(10), (12)-(14), (16), (18)-(20) are satisfied as shown in Table 6.

In the lower part of Table 1, there are shown values of constants K, $A_4$, $A_6$, $A_8$ and $A_{10}$ as to the aspheric surface given in the aspheric-surface equation.

TABLE 2

| Surface | R | D | $N_d$ | $v_d$ |
|---|---|---|---|---|
| 1 | 400.688 | 12.37 | 1.71300 | 53.9 |
| 2 | 70.209 | 38.49 | | |
| *3 | 200.133 | 21.02 | 1.60398 | 28.0 |
| *4 | 550.665 | $D_4$ | | |
| STO 5 | ∞ | −4.91 | | |
| 6 | 69.421 | 60.05 | 1.58313 | 59.4 |
| 7 | −69.421 | 1.57 | | |
| *8 | −67.924 | 9.82 | 1.60398 | 27.2 |
| *9 | −282.329 | 15.02 | | |
| *10 | 135.592 | 18.20 | 1.51006 | 55.9 |
| *11 | 52.107 | $D_{11}$ | | |
| *12 | 682.799 | 33.17 | 1.51006 | 55.9 |
| *13 | −154.165 | 10.00 | | |
| 14 | ∞ | 10.00 | 1.51680 | 64.2 |
| 15 | ∞ | 19.17 | | |

*Aspheric surface

| Group-to-group spacing | | |
|---|---|---|
| WIDE (×1.0) | MIDDLE (×1.5) | TELE (×2.11) |

TABLE 2-continued

| | | | | |
|---|---|---|---|---|
| D4 | 118.77 | 59.18 | 24.73 | |
| D11 | 59.72 | 102.20 | 154.03 | |

Aspheric coefficients

| | K | $A_4$ | $A_6$ | $A_8$ | $A_{10}$ |
|---|---|---|---|---|---|
| 3 | 8.013 | $-2.082 \times 10^{-11}$ | $1.412 \times 10^{-17}$ | $-3.233 \times 10^{-23}$ | $9.427 \times 10^{-30}$ |
| 4 | 75.032 | $-3.046 \times 10^{-11}$ | $9.330 \times 10^{-19}$ | $-2.099 \times 10^{-23}$ | $5.043 \times 10^{-30}$ |
| 8 | 1.778 | $-5.000 \times 10^{-7}$ | $-5.385 \times 10^{-11}$ | $1.256 \times 10^{-13}$ | $2.770 \times 10^{-17}$ |
| 9 | −123.491 | $-2.109 \times 10^{-7}$ | $-4.170 \times 10^{-10}$ | $-8.912 \times 10^{-14}$ | $4.623 \times 10^{-17}$ |
| 10 | −39.924 | $2.562 \times 10^{-10}$ | $-1.197 \times 10^{-15}$ | $1.136 \times 10^{-21}$ | $-1.424 \times 10^{-27}$ |
| 11 | −0.452 | $3.143 \times 10^{-11}$ | $-3.435 \times 10^{-16}$ | $-1.741 \times 10^{-23}$ | $2.210 \times 10^{-28}$ |
| 12 | 6.139 | $1.343 \times 10^{-7}$ | $1.493 \times 10^{-11}$ | $-6.641 \times 10^{-15}$ | $9.588 \times 10^{-19}$ |
| 13 | 0.822 | $6.492 \times 10^{-7}$ | $-1.106 \times 10^{-10}$ | $1.087 \times 10^{-14}$ | $2.632 \times 10^{-20}$ |

Figure 12:
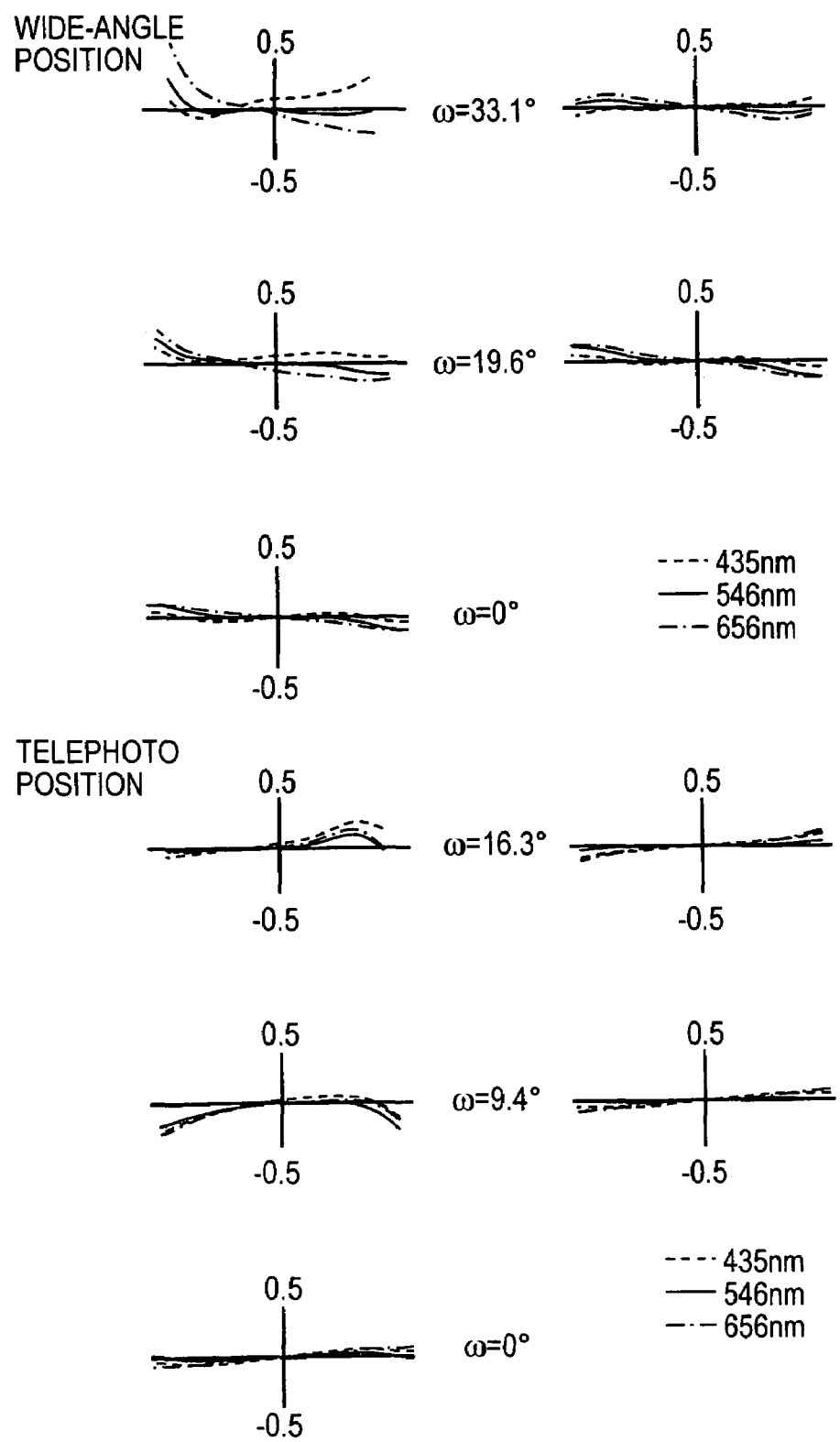
FIG. 12 shows a lateral color on the variable-power imaging optical system of the example 2, in the wide-angle and telephoto positions thereof.

FIG. 7 is an aberration figure illustrating aberrations (spherical aberration, astigmatism and distortion) on the variable-power imaging optical system of example 2, in the wide-angle (×1.0) and telephoto (×2.11) positions. FIG. 12 is an aberration figure illustrating lateral colors on the variable-power imaging optical system of example 2, in the wide-angle and telephoto positions. As apparent from FIGS. 7 and 12, aberrations are well corrected over the entire zoom range according to the variable-power imaging optical system of example 2.

EXAMPLE 3

Description is now made on a concrete structure of a variable-power imaging optical system according to example 3 of the invention.

Figure 3:
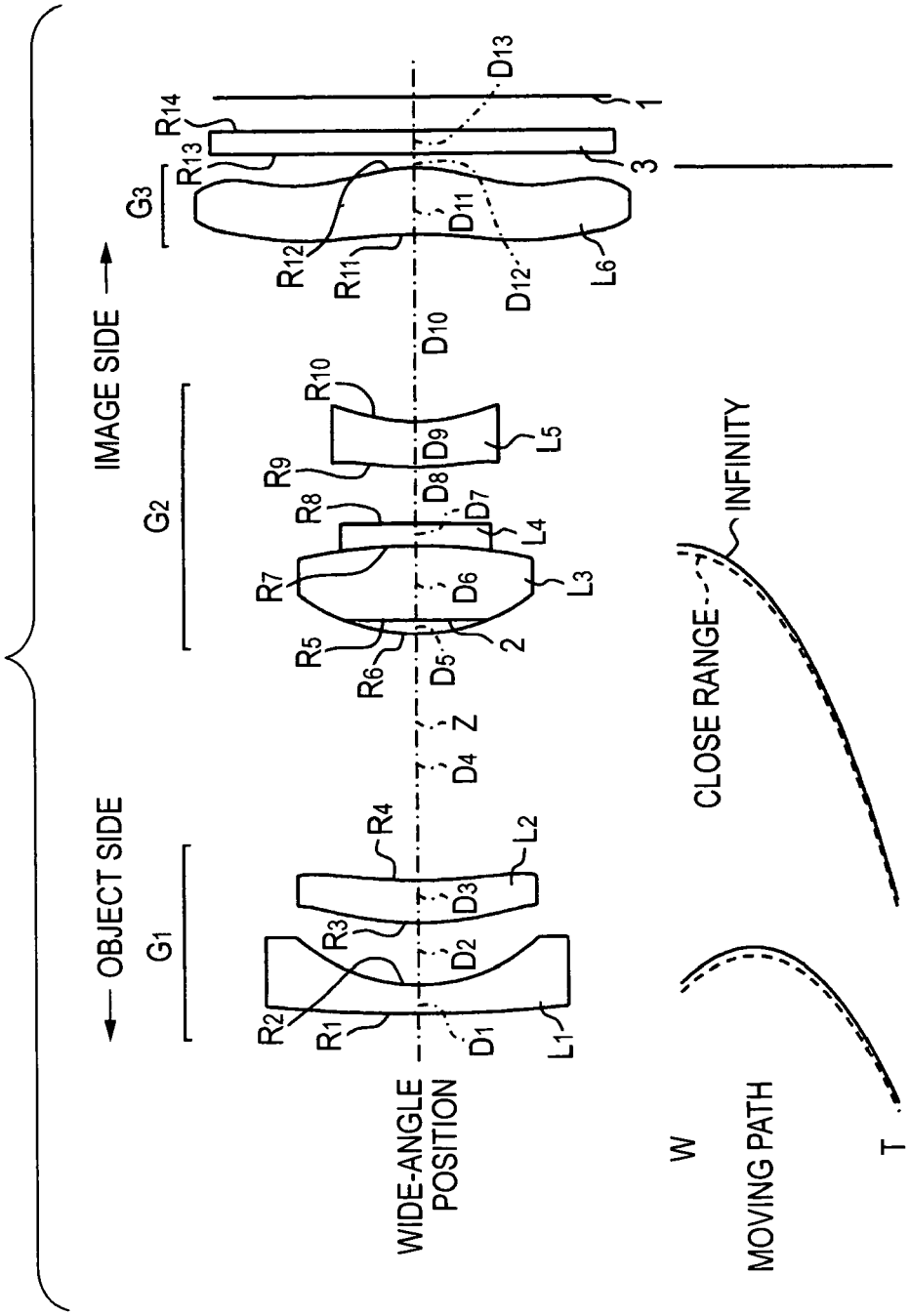
FIG. 3 shows a lens arrangement of a variable-power imaging optical system according to an example 3 of the invention.

The variable-power imaging optical system of example 3 has a lens arrangement nearly similar to that of the foregoing example 1, as shown in FIG. 3. However, there is a difference mainly in that the sixth lens $L_6$ is made in a bent lens form that is a positive meniscus form whose concave surface is directed on the optical axis toward the object side.

The variable-power imaging optical system of example 3 has values shown in Table 3.

In the upper part of Table 3, there are shown values of a radius-of-curvature R (mm) of each lens surface, a surface-to-surface axial spacing D (mm) of lenses, and a refractive index $N_d$ and Abbe number $v_d$ at the d-line of each lens.

In the middle part of Table 3, there are shown variable ranges of $D_4$ and $D_{10}$ given in the column of surface-to-surface axial spacing D, in the wide angle (WIDE: ×1.0), intermediate (MIDDLE: ×1.6) and telephoto (TELE: ×2.85) positions.

In the present example, the conditional expressions (1)-(20), (5'), (7'), (9')-(11'), (12') and (17') are all satisfied as shown in Table 6.

In the lower part of Table 1, there are shown values of constants K, $A_4$, $A_6$, $A_8$ and $A_{10}$ as to the aspheric surface given in the aspheric-surface equation.

TABLE 3

| Surface | R | D | $N_d$ | $v_d$ |
|---|---|---|---|---|
| 1 | 639.649 | 12.39 | 1.75500 | 52.3 |
| 2 | 72.504 | 27.07 | | |
| *3 | 121.348 | 18.28 | 1.60398 | 27.2 |
| *4 | 206.789 | $D_4$ | | |
| STO 5 | ∞ | −5.90 | | |
| 6 | 80.180 | 38.20 | 1.75500 | 52.3 |
| 7 | −218.887 | 9.61 | 1.92286 | 18.9 |
| 8 | −2702.050 | 24.58 | | |
| *9 | 117.808 | 19.66 | 1.50842 | 56.4 |
| *10 | 73.251 | $D_{10}$ | | |
| *11 | −168.607 | 28.92 | 1.50842 | 56.4 |
| *12 | −64.461 | 5.90 | | |
| 13 | ∞ | 9.83 | 1.5168 | 64.2 |
| 14 | ∞ | 14.64 | | |

*Aspheric surface

Group-to-group spacing

| | WIDE (×1.0) | MIDDLE (×1.6) | TELE (×2.11) |
|---|---|---|---|
| D4 | 112.66 | 67.76 | 10.64 |
| D10 | 81.13 | 114.59 | 235.89 |

Aspheric coefficients

| | K | $A_4$ | $A_6$ | $A_8$ | $A_{10}$ |
|---|---|---|---|---|---|
| 3 | 2.424 | $-6.827 \times 10^{-11}$ | $2.534 \times 10^{-17}$ | $-2.400 \times 10^{-23}$ | $-2.315 \times 10^{-29}$ |
| 4 | 14.706 | $-9.667 \times 10^{-11}$ | $1.910 \times 10^{-17}$ | $-2.583 \times 10^{-23}$ | $-4.132 \times 10^{-29}$ |

TABLE 3-continued

| | | | | | |
|---|---|---|---|---|---|
| 9 | −28.951 | $6.388 \times 10^{-7}$ | $-2.647 \times 10^{-9}$ | $1.805 \times 10^{-12}$ | $-7.383 \times 10^{-16}$ |
| 10 | −4.164 | $7.889 \times 10^{-7}$ | $-6.068 \times 10^{-10}$ | $1.402 \times 10^{-13}$ | $3.452 \times 10^{-18}$ |
| 11 | −2.974 | $8.745 \times 10^{-11}$ | $1.801 \times 10^{-17}$ | $-2.263 \times 10^{-23}$ | $4.258 \times 10^{-30}$ |
| 12 | −3.422 | $1.414 \times 10^{-10}$ | $9.217 \times 10^{-18}$ | $-2.348 \times 10^{-23}$ | $3.468 \times 10^{-30}$ |

FIG. 8 is an aberration figure illustrating aberrations (spherical aberration, astigmatism and distortion) on the variable-power imaging optical system of example 2, in the wide-angle (×1.0) and telephoto (×2.85) positions. FIG. 13 is an aberration figure illustrating lateral colors on the variable-power imaging optical system of example 3, in the wide-angle and telephoto positions. As apparent from FIGS. 8 and 13, aberrations are well corrected over the entire zoom range according to the variable-power imaging optical system of example 3.

EXAMPLE 4

Description is now made on a concrete structure of a variable-power imaging optical system according to example 4 of the invention.

Figure 4:
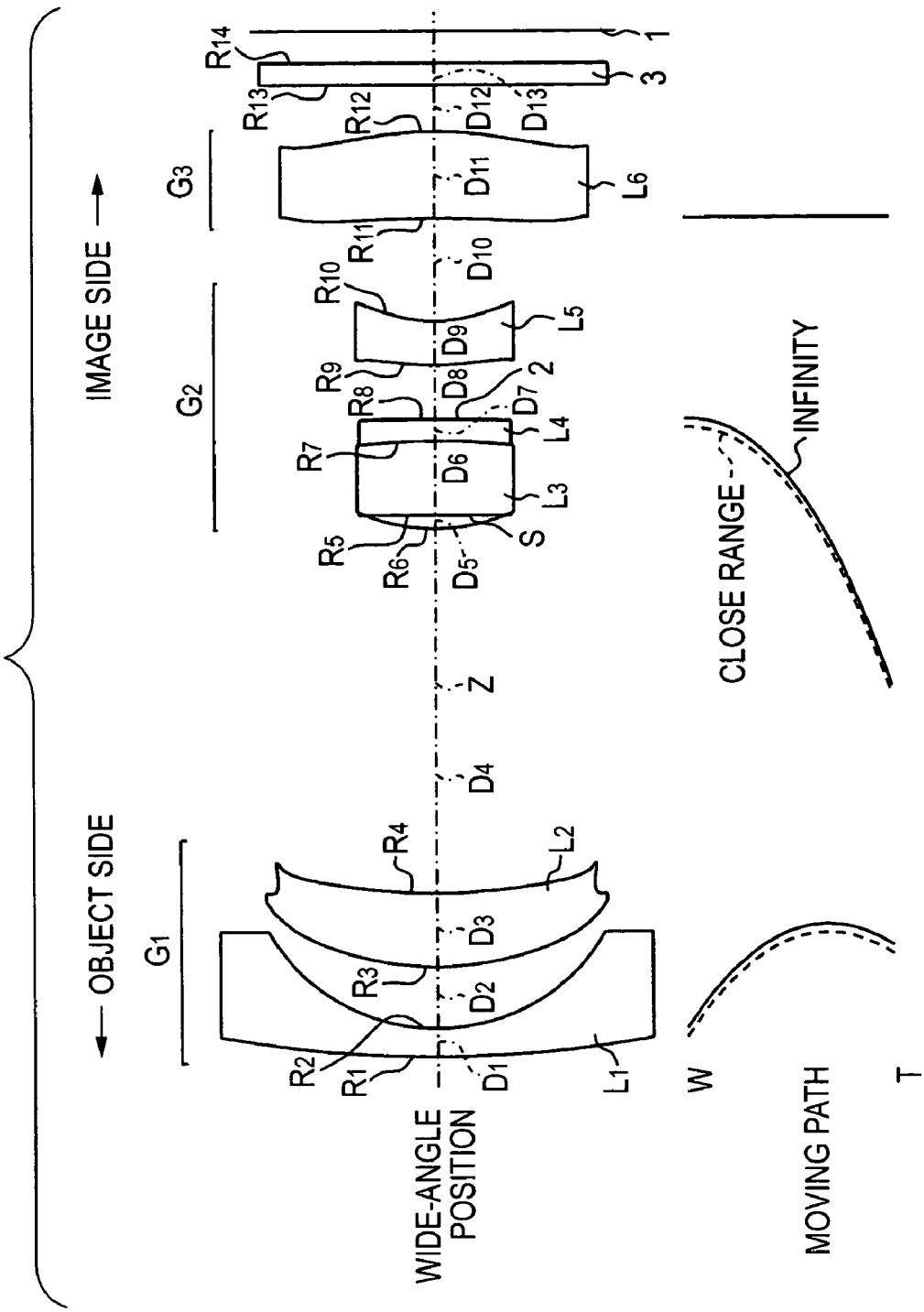
FIG. 4 shows a lens arrangement of a variable-power imaging optical system according to an example 4 of the invention.

The variable-power imaging optical system of example 4 has a lens arrangement nearly similar to that of the foregoing example 1, as shown in FIG. 4. However, there is a difference mainly in that the sixth lens $L_6$ is made in a bent lens form that is a positive meniscus form whose concave surface is directed on the optical axis toward the object side.

Meanwhile, in this example, an aperture stop 2 is arranged close to the image-side surface of the fourth lens $L_4$. Where the aperture stop 2 is arranged in the lens group in this manner and an opening S is arranged comparatively close to the aperture stop 2, shading can be reduced.

The variable-power imaging optical system of example 3 has values that are shown in Table 4.

In the upper part of Table 4, there are shown values of a radius-of-curvature R (mm) of each lens surface, a surface-to-surface axial spacing D (mm) of lenses, and a refractive index $N_d$ and Abbe number $v_d$ at the d-line of each lens.

In the middle part of Table 4, there are shown variable ranges of $D_4$ and $D_{10}$ given in the column of surface-to-surface axial spacing D, in the wide angle (WIDE: ×1.0), intermediate (MIDDLE: ×1.4) and telephoto (TELE: ×2.85) positions.

In the present example, the conditional expressions (1)-(20), (7'), (9'), (10') and (12') are all satisfied as shown in Table 6.

In the lower part of Table 4, there are shown values of constants K, $A_4$, $A_6$, $A_8$ and $A_{10}$ as to the aspheric surface given in the aspheric-surface equation.

TABLE 4

| Surface | R | D | $N_d$ | $v_d$ |
|---|---|---|---|---|
| 1 | 523.551 | 12.89 | 1.75908 | 51.9 |
| 2 | 84.646 | 28.65 | | |
| *3 | 125.636 | 34.03 | 1.60398 | 27.2 |
| *4 | 228.219 | $D_4$ | | |
| S 5 | ∞ | −6.14 | | |
| 6 | 81.526 | 41.14 | 1.75350 | 52.4 |
| 7 | −296.334 | 10.00 | 2.24257 | 17.3 |
| (STO) 8 | −1789.626 | 25.59 | | |
| *9 | 111.029 | 20.46 | 1.50867 | 56.4 |
| *10 | 61.078 | $D_{10}$ | | |
| *11 | −383.579 | 39.97 | 1.50842 | 56.4 |
| *12 | −157.519 | 21.49 | | |
| 13 | ∞ | 10.23 | 1.51680 | 64.2 |
| 14 | ∞ | 14.40 | | |

*Aspheric surface

| | Group-to-group spacing | | |
|---|---|---|---|
| | WIDE (×1.0) | MIDDLE (×1.4) | TELE (×2.85) |
| D4 | 174.61 | 103.20 | 12.36 |
| D10 | 47.57 | 74.38 | 171.58 |

| | Aspheric coefficients | | | | |
|---|---|---|---|---|---|
| | K | $A_4$ | $A_6$ | $A_8$ | $A_{10}$ |
| 3 | 2.408 | $-3.165 \times 10^{-7}$ | $9.527 \times 10^{-11}$ | $-2.262 \times 10^{-14}$ | $2.199 \times 10^{-18}$ |
| 4 | 10.202 | $-3.939 \times 10^{-7}$ | $1.100 \times 10^{-10}$ | $-2.935 \times 10^{-14}$ | $2.921 \times 10^{-18}$ |
| 9 | −27.854 | $4.877 \times 10^{-3}$ | $-7.671 \times 10^{-3}$ | $1.707 \times 10^{-3}$ | $-2.278 \times 10^{-4}$ |
| 10 | −2.776 | $6.609 \times 10^{-3}$ | $-1.821 \times 10^{-3}$ | $1.973 \times 10^{-4}$ | $1.049 \times 10^{-7}$ |
| 11 | 31.365 | $3.662 \times 10^{-7}$ | $-7.335 \times 10^{-12}$ | $-1.692 \times 10^{-15}$ | $2.262 \times 10^{-18}$ |
| 12 | −0.703 | $2.090 \times 10^{-7}$ | $5.187 \times 10^{-11}$ | $-1.708 \times 10^{-14}$ | $2.666 \times 10^{-18}$ |

TABLE 4-continued

FIG. 9 is an aberration figure illustrating aberrations (spherical aberration, astigmatism and distortion) on the variable-power imaging optical system of example 4, in the wide-angle (×1.0) and telephoto (×2.85) positions. FIG. 14 is an aberration figure illustrating lateral colors on the variable-power imaging optical system of example 4, in the wide-angle and telephoto positions. As apparent from FIGS. 9 and 14, aberrations are well corrected over the entire zoom range according to the variable-power imaging optical system of example 4.

EXAMPLE 5

Description is now made on a concrete structure of a variable-power imaging optical system according to example 5 of the invention.

Figure 5:
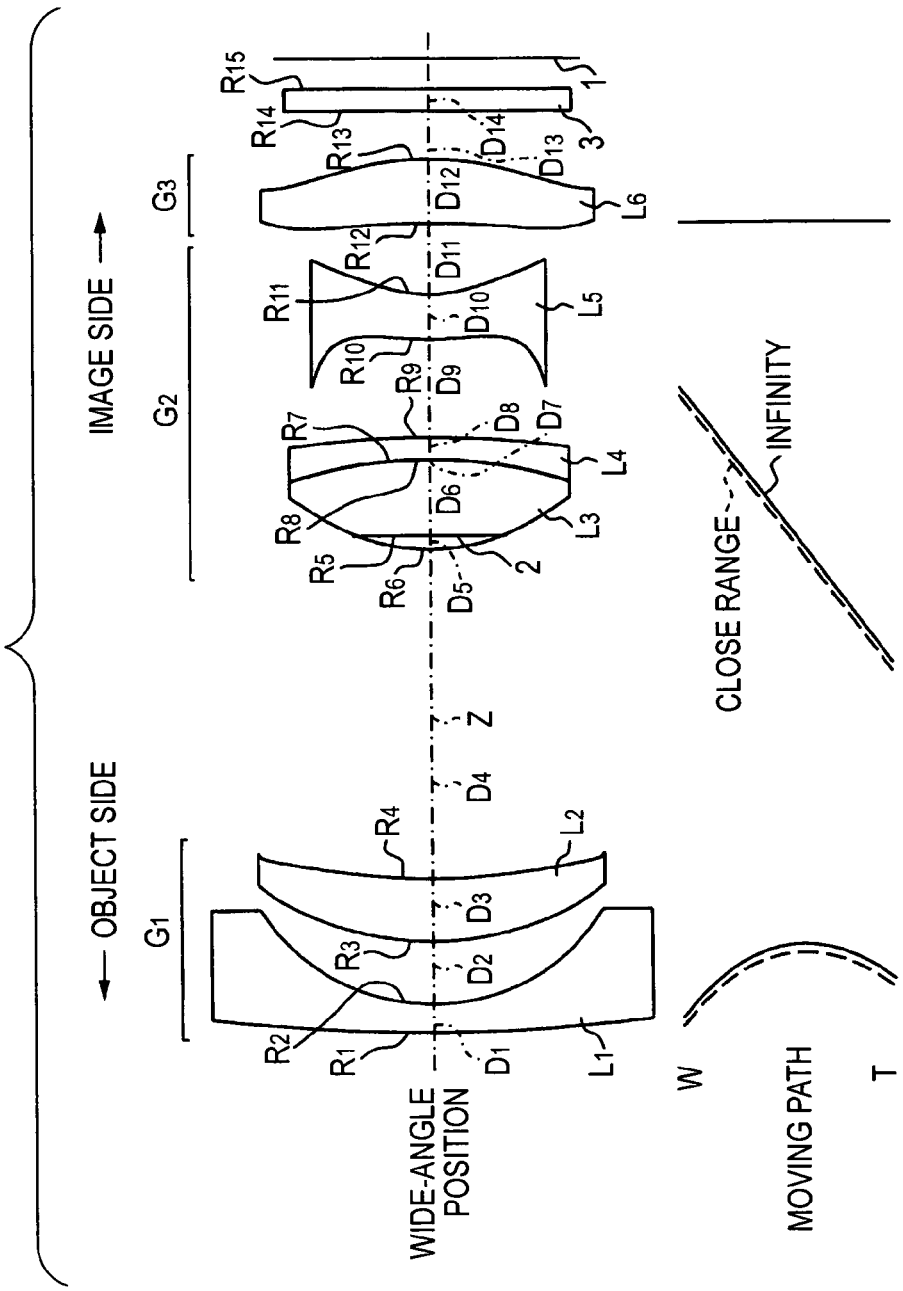
FIG. 5 shows a lens arrangement of a variable-power imaging optical system according to an example 5 of the invention.

The variable-power imaging optical system of example 5 has a lens arrangement nearly similar to that of the foregoing example 1, as shown in FIG. 5. However, there is a difference mainly in that the third lens $L_3$ has an aspheric surface (by glass molding).

The variable-power imaging optical system of example 5 has values that are shown in Table 5.

In the upper part of Table 5, there are shown values of a radius-of-curvature R (mm) of each lens surface, a surface-to-surface axial spacing D (mm) of lenses, and a refractive index $N_d$ and Abbe number $v_d$ at the d-line of each lens.

In the middle part of Table 3, there are shown variable ranges of $D_4$ and $D_{10}$ given in the column of surface-to-surface axial spacing D, in the wide angle (WIDE: ×1.0), intermediate (MIDDLE: ×1.6) and telephoto (TELE: ×2.99) positions.

In the present example, the conditional expressions (1)-(7), (9)-(20), (7'), (7'''), (12') and (12'') are all satisfied as shown in Table 6.

In the lower part of Table 5, there are shown values of constants K, $A_4$, $A_6$, $A_8$ and $A_{10}$ as to the aspheric surface given in the aspheric-surface equation.

TABLE 5

| Surface | R | D | $N_d$ | $v_d$ |
|---|---|---|---|---|
| 1 | 836.904 | 12.57 | 1.75500 | 52.3 |
| 2 | 84.372 | 27.92 | | |
| *3 | 124.633 | 26.42 | 1.63000 | 23.0 |
| *4 | 236.782 | $D_4$ | | |
| STO 5 | ∞ | −5.98 | | |
| *6 | 80.480 | 39.89 | 1.71638 | 54.4 |
| 7 | −186.619 | 0.20 | 1.71638 | 17.3 |
| 8 | −186.619 | 9.75 | 2.24257 | 17.3 |
| 9 | −394.611 | 44.08 | | |
| *10 | 128.728 | 19.94 | 1.51825 | 55.0 |
| *11 | 53.911 | $D_{11}$ | | |
| *12 | −426.222 | 30.30 | 1.51059 | 56.1 |
| *13 | −132.806 | 20.94 | | |
| 14 | ∞ | 9.97 | 1.51680 | 64.2 |
| 15 | ∞ | 13.52 | | |

*Aspheric surface

| Group-to-group spacing | | | |
|---|---|---|---|
| | WIDE (×1.0) | MIDDLE (×1.6) | TELE (×2.99) |
| D4 | 149.42 | 89.26 | 9.28 |
| D10 | 30.62 | 57.61 | 164.89 |

| Aspheric coefficients | | | | | |
|---|---|---|---|---|---|
| | K | $A_4$ | $A_6$ | $A_8$ | $A_{10}$ |
| 3 | 2.009 | $-2.176 \times 10^{-7}$ | $3.192 \times 10^{-11}$ | $-1.048 \times 10^{-14}$ | $1.319 \times 10^{-18}$ |
| 4 | 8.150 | $-2.517 \times 10^{-7}$ | $1.682 \times 10^{-11}$ | $-6.448 \times 10^{-15}$ | $9.245 \times 10^{-19}$ |
| 6 | 0.353 | $9.048 \times 10^{-8}$ | $-5.036 \times 10^{-11}$ | $7.478 \times 10^{-14}$ | $-3.188 \times 10^{-17}$ |
| 10 | −28.080 | $-1.732 \times 10^{-6}$ | $-3.672 \times 10^{-10}$ | $-2.665 \times 10^{-13}$ | $1.071 \times 10^{-16}$ |
| 11 | −5.136 | $1.057 \times 10^{-6}$ | $-1.140 \times 10^{-9}$ | $4.389 \times 10^{-13}$ | $-4.435 \times 10^{-17}$ |
| 12 | 27.665 | $4.569 \times 10^{-7}$ | $1.498 \times 10^{-11}$ | $-1.782 \times 10^{-15}$ | $3.267 \times 10^{-19}$ |
| 13 | 2.776 | $5.717 \times 10^{-7}$ | $9.119 \times 10^{-11}$ | $-2.303 \times 10^{-14}$ | $2.647 \times 10^{-18}$ |

FIG. 10 is an aberration figure illustrating aberrations (spherical aberration, astigmatism and distortion) on the variable-power imaging optical system of example 5, in the wide-angle (×1.0) and telephoto (×2.99) positions. FIG. 15 is an aberration figure illustrating lateral colors on the variable-power imaging optical system of example 5, in the wide-angle and telephoto positions. As apparent from FIGS. 10 and 15, aberrations are well corrected over the entire zoom range according to the variable-power imaging optical system of example 5.

TABLE 6

|  | Example 1 | Example 2 | Example 3 | Example 4 | Example 5 |
|---|---|---|---|---|---|
| fw | 99.800 | 99.597 | 99.257 | 99.760 | 100.000 |
| ft | 210.579 | 210.150 | 282.882 | 284.316 | 299.000 |
| ft/fw | 2.110 | 2.110 | 2.850 | 2.850 | 2.990 |
| TL | 426.136 | 422.752 | 449.709 | 474.915 | 429.557 |
| YIM | 71.430 | 71.384 | 71.822 | 74.770 | 72.863 |
| fg2 | 385.361 | 504.602 | 445.950 | 407.595 | 378.733 |
| f1g | −193.322 | −172.018 | −148.947 | −203.009 | −193.871 |
| f2gp | −263.992 | −149.403 | −445.866 | −308.499 | −196.100 |
|  |  | −178.389 |  |  |  |
| f2g | 131.652 | 123.239 | 114.666 | 129.446 | 119.194 |
|  |  | 1.448 |  |  |  |
| D | 110.880 | 104.670 | 92.041 | 97.189 | 113.857 |
| Ds | 18.966 | 15.019 | 24.579 | 25.588 | 44.080 |
| f3g | 536.420 | 248.868 | 186.877 | 494.026 | 363.511 |
| vg1 | 53.9 | 53.9 | 52.3 | 51.9 | 52.3 |
| Expressions 1, 13 Ng2 | 1.604 | 1.604 | 1.604 | 1.604 | 1.630 |
| Expressions 2, 14 vg2 | 27.2 | 28.0 | 27.2 | 27.2 | 23.0 |
| Expressions 3 TL/YIM | 5.966 | 5.922 | 6.261 | 6.352 | 5.895 |
|  |  | Expressions 4, 16 |fps/ft| |  |  |  |
| (where fps is a plastic lens in the first group) | 1.830 | 2.401 | 1.576 | 1.434 | 1.267 |
| (where fps is a plastic lens in the second group) | 1.254 | 0.711 | 1.576 | 1.085 | 0.656 |
|  |  | 0.849 |  |  |  |
| (where fps is a plastic lens) | 2.547 | 1.184 | 0.661 | 1.738 | 1.216 |
| Expressions 5, 11, 17, 5', 11', 17' |Pp$_{12}$ × ft| | 0.251 | 2.168 | 0.000 | 0.224 | 0.735 |
| Expression 6 |fg2/f1g| | 1.993 | 2.933 | 2.994 | 2.008 | 1.954 |
| Expressions 7, 12, 7', 12', 7", 12" Xp | 69.97885 | 72.03705 | 69.97885 | 69.97885 | 61.10870 |
| Expression 8 (fg2/fw) | 3.861 | 5.066 | 4.493 | 4.086 | 3.787 |
| Expressions 9, 10, 9', 10' |f2gp/f2g| | 2.005 | 1.212 | 3.888 | 2.383 | 1.645 |
| Expression 15 Ds/D | 0.171 | 0.143 | 0.267 | 0.263 | 0.387 |
| Expression 18 f3G/fw | 5.375 | 2.499 | 1.883 | 4.952 | 3.635 |
| Expressions 19, 20 vg1 − vg2 | 26.7 | 25.9 | 25.1 | 24.7 | 29.3 |

Incidentally, although the examples showed that the first and second lens groups $G_1$, $G_2$ only are moved independently from each other during zooming, the idea of the invention covers such a case that the third lens group $G_3$ somewhat moves independently, say, for aberration correction together with the movement of the first and second lens groups $G_1$, $G_2$.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2006-11659, filed Jan. 19, 2006, the entire disclosure of which is herein incorporated by reference.

What is claimed is:

1. A variable-power imaging optical system comprising: in order from an object side thereof, a first lens group having a negative refractive power, the first lens group comprising a first lens of a negative lens, and a second lens of a positive lens, in this order from the object side;

a second lens group having a positive refractive power, the second lens group comprising a third lens of a positive lens, a fourth lens of a negative lens, and a fifth lens for correcting aberration, the fifth lens having an aspheric surface, in this order from the object side; and a third lens group comprising a sixth lens for correcting aberration, wherein the first lens is a glass lens, the second lens is a plastic lens having an aspheric convex surface on the object side, the third lens is a double-convex glass lens, both surfaces of the double-convex glass lens being spherical, the fifth lens is a plastic lens in a meniscus form having at least one aspheric surface, and the sixth lens is a positive lens;

zooming is performed by moving at least the first and second lens groups along an optical axis independently from each other, and the variable-power imaging optical system satisfies Conditional Expressions (6) and (7):

$$|fg2/f1g|>1.8 \quad (6)$$

$$Xp<73.0 \quad (7)$$

wherein fg2 represents a focal length of the second lens, f1g represent a combined focal length of the first lens group, and Xp represents a value of Np2×Np2×Vp2, provided that a plastic material of the second lens has a refractive index Np2 and an Abbe number vp2.

2. The variable-power imaging optical system according to claim 1, wherein both surfaces of the first lens are spherical, and the second lens satisfies Conditional Expression (8):

$$fg2/fw>3.8 \quad (8)$$

wherein fw represent a combined focal length of the variable-power imaging optical system in a wide-angle position.

3. The variable-power imaging optical system according to claim 1, wherein both surfaces of the fourth lens are spherical, and the second lens group satisfies Conditional Expression (9):

$$|f2gp/f2g|>1.2 \quad (9)$$

wherein f2gp represents a focal length of the plastic lens in the second lens group, and f2g represents a combined focal length of the second lens group.

4. An imaging device comprising: a variable-power imaging optical system according to claim 1; and a solid-state imaging element that captures an image of a subject focused by the variable-power imaging optical system.

5. A variable-power imaging optical system comprising: in order from an object side thereof, a first lens group having a negative refractive power, the first lens group comprising a first lens of a negative lens, and a second lens of a positive lens, in this order from the object side;

a second lens group having a positive refractive power, the second lens group comprising a third lens of a positive lens, a fourth lens of a negative lens, and a fifth lens for correcting aberration, the fifth lens having an aspheric surface, in this order from the object side; and a third lens group comprising a sixth lens for correcting aberration, wherein the three lens groups each includes a plastic lens;

zooming is performed by moving at least the first and second lens groups along an optical axis independently from each other;

focusing is performed by moving the first and second lens groups jointly along the optical axis; and the variable-power imaging optical system satisfies Conditional Expressions (10) to (12):

$$|f2gp/f2g|>1.2 \quad (10)$$

$$|Pp_{12} \times ft|<1.0 \quad (11)$$

$$Xp<73.0 \quad (12)$$

wherein f2gp represents a focal length of the plastic lens in the second lens group, f2g represents a combined focal length of the second lens group, $Pp_{12}$ represents a sum of reciprocals of focal lengths of plastic lenses included in the first and second lens groups, ft represents a combined focal length of the variable-power imaging optical system in a telephoto position, and Xp represents a value of Np2×Np2×vp2, provided that a plastic material of the plastic lens in the first lens group has a refractive index Np2 and an Abbe number vp2.

6. The variable-power imaging optical system according to claim 5, the plastic lens in the second lens group is the fifth lens.

7. An imaging device comprising: a variable-power imaging optical system according to claim 5; and a solid-state imaging element that captures an image of a subject focused by the variable-power imaging optical system.

8. A variable-power imaging optical system comprising: in order from an object side thereof, a first lens group having a negative refractive power, the first lens group consisting of a first lens of a negative lens, and a second lens of a positive lens, in this order from the object side;

a second lens group having a positive refractive power, the second lens group comprising a third lens of a positive lens, a fourth lens of a negative lens, and a fifth lens for correcting aberration, the fifth lens having an aspheric surface, in this order from the object side; and a third lens group comprising a sixth lens for correcting aberration, wherein zooming is performed by moving at least the first and second lens groups along an optical axis independently from each other, and the variable-power imaging optical system satisfies Conditional Expressions (1) to (3):

$$Ng2>1.6 \quad (1)$$

$$vg2<29 \quad (2)$$

$$TL/YIM<6.352 \quad (3)$$

wherein Ng2 is a refractive index of the second lens, vg2 is an Abbe number of the second lens, and YIM is a height of an image.

9. The variable-power imaging optical system according to claim 8, wherein focusing is performed by moving the first and second lens groups jointly along the optical axis.

10. The variable-power imaging optical system according to claim 8, wherein the first lens is a glass lens in a meniscus form having a convex surface on the object side, both surfaces of the glass lens being spherical, and the second lens is a plastic lens having an aspheric convex surface on the object side.

11. The variable-power imaging optical system according to claim 10, wherein the third lens is a double-convex lens.

12. The variable-power imaging optical system according to claim 11, wherein the sixth lens is a positive plastic lens having an aspheric surface, and the variable-power imaging optical system satisfies Conditional Expression (4):

$$|fps/ft|>0.6 \quad (4)$$

wherein fps represents a minimal focal length of plastic lenses, and ft represents a combined focal length of the variable-power imaging optical system in a telephoto position.

13. The variable-power imaging optical system according to claim 8, wherein the third lens and the fourth lens each is a glass lens, both surfaces of the glass lens are spherical, and the third lens and the fourth lens are cemented together.

14. The variable-power imaging optical system according to claim 13, wherein the third lens is a double-convex lens.

15. The variable-power imaging optical system according to claim 14, wherein the sixth lens is a positive plastic lens having an aspheric surface, and the variable-power imaging optical system satisfies Conditional Expression (4):

$$|fps/ft|>0.6 \qquad (4)$$

wherein fps represents a minimal focal length of plastic lenses, and ft represents a combined focal length of the variable-power imaging optical system in a telephoto position.

16. The variable-power imaging optical system according to claim 15, which satisfies Conditional Expression (5):

$$|Pp_{12} \times ft|<1.0 \qquad (5)$$

wherein $Pp_{12}$ represents a sum of reciprocals of focal lengths of plastic lenses included in the first and second lens groups, and ft represents a combined focal length of the variable-power imaging optical system in a telephoto position.

17. The variable-power imaging optical system according to claim 8, wherein the sixth lens is a positive plastic lens having an aspheric surface, and the variable-power imaging optical system satisfies Conditional Expression (4):

$$|fps/ft|>0.6 \qquad (4)$$

wherein fps represents a minimal focal length of plastic lenses, and ft represents a combined focal length of the variable-power imaging optical system in a telephoto position.

18. The variable-power imaging optical system according to claim 8, which satisfies Conditional Expression (5):

$$|Pp_{12} \times ft|<1.0 \qquad (5)$$

wherein $Pp_{12}$ represents a sum of reciprocals of focal lengths of plastic lenses included in the first and second lens groups, and ft represents a combined focal length of the variable-power imaging optical system in a telephoto position.

19. An imaging device comprising: a variable-power imaging optical system according to claim 8; and a solid-state imaging element that captures an image of a subject focused by the variable-power imaging optical system.

20. A variable-power imaging optical system comprising: in order from an object side thereof,
  a first lens group having a negative refractive power, the first lens group comprising a first lens of a negative lens, and a second lens of a positive lens, in this order from the object side;
  a second lens group having a positive refractive power, the second lens group comprising a third lens of a positive lens, a fourth lens of a negative lens, and a fifth lens for correcting aberration, the fifth lens having an aspheric surface, in this order from the object side; and
  a third lens group comprising a sixth lens for correcting aberration,
  wherein
  the first lens has a convex surface on the object side, the second lens has an aspheric convex surface on the object side, and the third lens is a double-convex lens, both surfaces of the third lens being spherical;
  zooming is performed by moving at least the first and second lens groups along an optical axis independently from each other, and
  the variable-power imaging optical system satisfies Conditional Expressions (13) to (15):

$$Ng2>1.6 \qquad (13)$$

$$vg2<29 \qquad (14)$$

$$0.23 \leq Ds/D \leq 0.5 \qquad (15)$$

wherein Ng2 represents a refractive index of the second lens, vg2 represents an Abbe number of the second lens $L_2$, Ds represents a spacing between the fourth lens and the fifth lens, and D represents a distance along the optical axis between a lens surface of the second lens group closest to the object side and a lens surface thereof closest to an image side of the variable-power imaging optical system.

21. The variable-power imaging optical system according to claim 20, wherein the first lens is a glass lens in a negative meniscus form, both surfaces of the glass lens being spherical, the second lens is a plastic lens, the third and fourth lenses are cemented together and each is a glass lens, both surfaces of the glass lens being spherical, and the fifth lens is a plastic lens.

22. The variable-power imaging optical system according to claim 21, wherein the sixth lens is a positive plastic lens, focusing is performed by moving the first and second lens groups jointly, and the variable-power imaging optical system satisfies Conditional Expression (16):

$$|fps/ft|>0.6 \qquad (16)$$

wherein fps represents a minimal focal lengths of plastic lenses, and ft represents a combined focal length of the variable-power imaging optical system in a telephoto position.

23. The variable-power imaging optical system according to claim 21, which satisfies Conditional Expression (17):

$$|Pp_{12} \times ft|<1.0 \qquad (17)$$

wherein $Pp_{12}$ represents a sum of reciprocals of focal lengths of plastic lenses included in the first and second lens groups, and fit represents a combined focal length of the variable-power imaging optical system in a telephoto position.

24. The variable-power imaging optical system according to claim 20, wherein the sixth lens is a positive plastic lens, focusing is performed by moving the first and second lens groups jointly, and the variable-power imaging optical system satisfies Conditional Expression (16):

$$|fps/ft|>0.6 \qquad (16)$$

wherein fps represents a minimal focal lengths of plastic lenses, and ft represents a combined focal length of the variable-power imaging optical system in a telephoto position.

25. The variable-power imaging optical system according to claim 20, which satisfies Conditional Expression (17):

$$|Pp_{12} \times ft|<1.0 \qquad (17)$$

wherein $Pp_{12}$ represents a sum of reciprocals of focal lengths of plastic lenses included in the first and second lens groups, and ft represents a combined focal length of the variable-power imaging optical system in a telephoto position.

26. An imaging device comprising: a variable-power imaging optical system according to claim 20; and a solid-state imaging element that captures an image of a subject focused by the variable-power imaging optical system.

* * * * *